US011188800B1

(12) United States Patent
 Douglas et al.

(10) Patent No.: US 11,188,800 B1
(45) Date of Patent: Nov. 30, 2021

(54) METHOD AND APPARATUS FOR IMPROVED ANALYSIS OF CT SCANS OF BAGS

(71) Applicants: Robert Edwin Douglas, Winter Park, FL (US); Kathleen Mary Douglas, Winter Park, FL (US); David Byron Douglas, Winter Park, FL (US)

(72) Inventors: Robert Edwin Douglas, Winter Park, FL (US); Kathleen Mary Douglas, Winter Park, FL (US); David Byron Douglas, Winter Park, FL (US)

(*) Notice: Subject to any disclaimer, the term of this patent is extended or adjusted under 35 U.S.C. 154(b) by 0 days.

(21) Appl. No.: 17/164,772

(22) Filed: Feb. 1, 2021

Related U.S. Application Data

(63) Continuation-in-part of application No. 17/156,583, filed on Jan. 24, 2021, which is a continuation-in-part of application No. 16/703,629, filed as application No. PCT/US2019/023968 on Mar. 26, 2019, now Pat. No. 10,956,635.

(60) Provisional application No. 62/651,934, filed on Apr. 3, 2018, provisional application No. 62/748,555, filed on Oct. 22, 2018, provisional application No. 62/776,234, filed on Dec. 6, 2018.

(51) Int. Cl.
 *G06K 9/62* (2006.01)
 *G06T 7/11* (2017.01)
 *G06N 20/00* (2019.01)
 *G06K 9/20* (2006.01)

(52) U.S. Cl.
 CPC ........... *G06K 9/628* (2013.01); *G06K 9/2054* (2013.01); *G06N 20/00* (2019.01); *G06T 7/11* (2017.01); *G06T 2207/10081* (2013.01); *G06T 2207/20021* (2013.01)

(58) Field of Classification Search
 CPC ........ G06K 9/628; G06K 9/2054; G06T 7/11; G06N 20/00
 See application file for complete search history.

(56) References Cited

U.S. PATENT DOCUMENTS

| | | | | |
|---|---|---|---|---|
| 6,415,048 | B1* | 7/2002 | Schneider | G06T 7/0012 378/20 |
| 9,760,801 | B2* | 9/2017 | Bremer | G06T 7/0012 |
| 10,268,924 | B2* | 4/2019 | Gu | G06K 9/0063 |
| 10,499,857 | B1* | 12/2019 | Nguyen | G06N 3/08 |
| 10,504,261 | B2* | 12/2019 | Cinnamon | G06T 1/0007 |
| 10,586,400 | B2* | 3/2020 | Douglas | G06T 15/08 |
| 10,881,964 | B1* | 1/2021 | Dills | G06K 9/6221 |

(Continued)

*Primary Examiner* — Mia M Thomas

(57) ABSTRACT

A method, software and apparatus are disclosed to improve security by helping determine whether a bag contains a prohibited item. A CT scan of a bag is performed to generate an image. An artificial intelligence algorithm is performed to classify portions of an image as normal and portions of said image as abnormal. A first type of image processing for said normal portion(s) of said image. A second type of image processing for said abnormal portion(s) of said image wherein said second type of image processing is different from said first type of image processing. The normal portion(s) of the image are displayed with said first type of image processing and said abnormal portion(s) of the image are displayed with said second type of image processing to a TSA Agent for analysis of said image. In the preferred embodiment, the TSA Agent will perform the analysis on an extended reality head display unit.

19 Claims, 25 Drawing Sheets

IMPROVED BAGGAGE SCREENING PROCESS

(56) References Cited

U.S. PATENT DOCUMENTS

| | | | | |
|---|---|---|---|---|
| 11,045,271 | B1* | 6/2021 | Tran | G06N 20/00 |
| 2012/0232375 | A1* | 9/2012 | Zebaze | A61B 6/032 |
| | | | | 600/407 |
| 2013/0185096 | A1* | 7/2013 | Giusti | G16H 20/40 |
| | | | | 705/3 |
| 2015/0287188 | A1* | 10/2015 | Gazit | G06T 5/008 |
| | | | | 382/131 |
| 2016/0012604 | A1* | 1/2016 | Firouzian | G06T 7/11 |
| | | | | 382/128 |
| 2017/0263139 | A1* | 9/2017 | Deng | G06K 9/4661 |
| 2018/0308245 | A1* | 10/2018 | Yang | A61B 6/5247 |
| 2018/0329609 | A1* | 11/2018 | De Swarte | G06T 19/00 |
| 2019/0019318 | A1* | 1/2019 | Cinnamon | G06T 7/001 |
| 2019/0114510 | A1* | 4/2019 | Bremer | G06K 9/6271 |
| 2019/0131015 | A1* | 5/2019 | Pestian | G06N 20/00 |
| 2019/0205606 | A1* | 7/2019 | Zhou | G06N 3/0454 |
| 2019/0244346 | A1* | 8/2019 | Schafer | G06T 7/155 |
| 2019/0259160 | A1* | 8/2019 | Simanovsky | G06K 9/00771 |
| 2019/0340763 | A1* | 11/2019 | Laserson | A61B 6/5235 |
| 2020/0074215 | A1* | 3/2020 | Wang | G06T 7/70 |
| 2020/0113543 | A1* | 4/2020 | Wasielewski | A61B 8/4477 |
| 2020/0160690 | A1* | 5/2020 | Kurani | G08B 25/10 |
| 2020/0175277 | A1* | 6/2020 | Guttmann | G06K 9/00718 |
| 2020/0258239 | A1* | 8/2020 | Sandberg | G06K 9/6201 |
| 2020/0394442 | A1* | 12/2020 | Ahmed | G06K 9/628 |
| 2020/0410391 | A1* | 12/2020 | Barrett | G06F 21/41 |
| 2021/0000013 | A1* | 1/2021 | Robertson | B25J 15/0019 |
| 2021/0074425 | A1* | 3/2021 | Carter | G06K 9/628 |
| 2021/0089794 | A1* | 3/2021 | Chen | G06K 9/4671 |

* cited by examiner

DATA FOR AIDED MATERIAL CLASSIFICATION

| Material | Hounsfield Units |
|---|---|
| Non-contraband item(s) | |
| Air | -1,000 |
| Water | 0 |
| Clothing | ? |
| Aluminum | +2200 |
| Book | ? |
| Silver | +17,000 |
| Gold | +30,000 |
| Contraband item(s) | |
| C4 | ? |
| Ammonium Nitrate Fertilizer | ? |
| Dynamite | ? |
| Fuel Oil | ? |
| Cash | ? |

Figure 6

TECHNIQUE FOR DETERMINING WHERE TO MEASURE TO ENSURE ACCURATE HOUNSFIELD UNIT

3D VIEWING

3D VOLUME CURSOR FOR FILTERING AND MATERIAL ANALYSIS

ILLUSTRATION OF 2D VIEWING OF IMAGES

IMPLEMENTATION OF THE PROCESS FOR BAGGAGE ANALYSIS
WHEREIN NORMAL PORTIONS ARE FILTERED
Fig. 11A
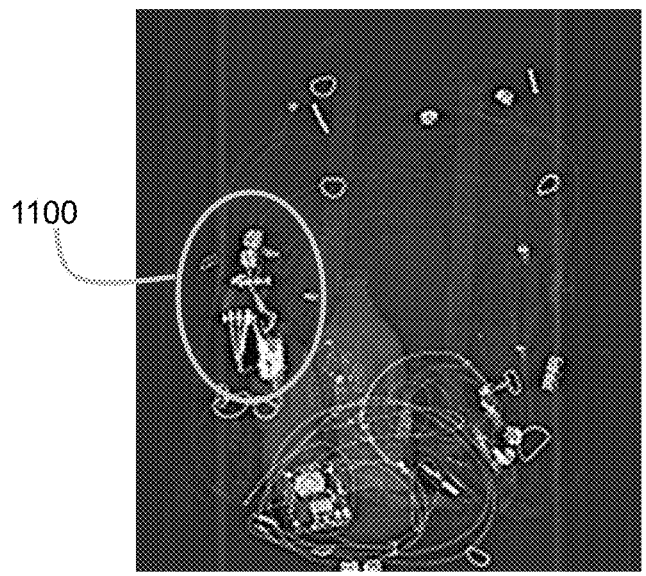
Fig. 11B
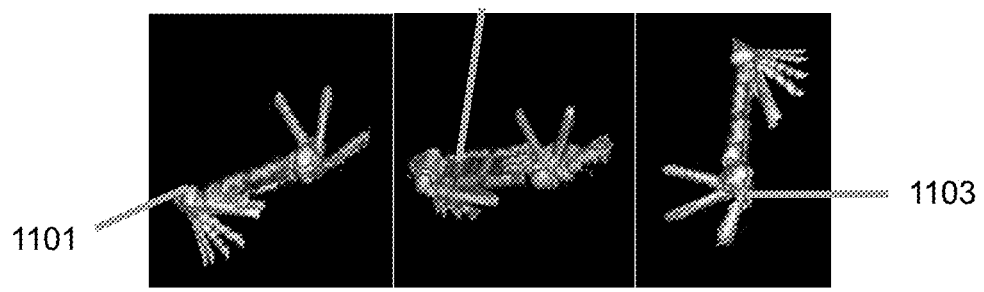
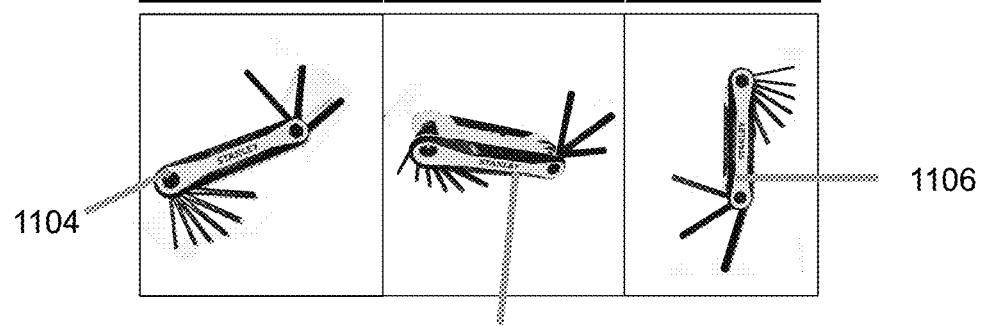

VISUAL REPRESENTATION ADJUSTMENT LOGIC TECHNIQUES

US Patent 10,586,400, PROCESSING 3D MEDICAL IMAGES TO ENHANCE VISUALIZATION, is incorporated by reference in its entirety. This patent discusses the use of more than one visual representation adjustment logic for a scan. This imporved over the prior art because it allowed improved visualization of Hounsfield Unit ranges, which are of interest, as shown in Figure 2 of the '400 patent.

This current patent extends this use of a second, third, or more visual representation adjustment logic for an image because it teaches ways (above the data unit range method discussed in '400) of selecting a group of voxels.

The type of visual representation adjustment logic implemented includes:
- presentation of voxels in different colors, gray shades and filtering techniques
- filtering of pixel(s)/voxel(s)
- altering the shape, size, orientation, location and data unit of a pixel(s)/voxel(s)

The method by which the second, third, or more groups of pixel(s)/voxels within imaging examination are grouped include:
- grouping by data unit
- grouping by location (e.g., use of a 3D volume cursor)
- grouping by segmented structure
- grouping by modified segmented structure
- grouping by combination of the above

Figure 16

CONFORMAL BOUNDARY METHOD

1700

1702

1701

PREFERRED OPTIONS FOR 2D SLICE BY SLICE

| Viewing option | Preferred viewing method | |
|---|---|---|
| | Normal | Abnormal |
| Window level setting | Non-optimized | Optimized |
| Filtering | More | Less |
| Transparency adjustment | More | Less |
| Smoothing | More | Less |
| Spatial resolution | Lower | Higher |
| Contrast resolution | Lower | Higher |
| Brightness | Darker | Brighter |
| Color | Darker | Brighter |

Figure 18

ALTERATION OF 2D SLICE OF A SCANNED VOLUME BY FILTERING

Fig. 20A

| 40 | 38 | 34 | 35 | 35 | 34 | 35 | 36 | 35 | 34 |
|----|----|----|----|----|----|----|----|----|----|
| 40 | 37 | 38 | 37 | 33 | 34 | 34 | 35 | 36 | 35 |
| 39 | 38 | 35 | 38 | 38 | 33 | 33 | 35 | 36 | 33 |
| 41 | 39 | 39 | 40 | 39 | 32 | 36 | 36 | 34 | 34 |
| 39 | 40 | 40 | 44 | 40 | 40 | 35 | 36 | 37 | 35 |
| 38 | 44 | 52 | 50 | 44 | 46 | 35 | 35 | 34 | 35 |
| 43 | 51 | 51 | 54 | 48 | 47 | 36 | 36 | 35 | 36 |
| 43 | 50 | 54 | 56 | 46 | 45 | 36 | 37 | 35 | 38 |
| 44 | 51 | 53 | 52 | 50 | 45 | 35 | 36 | 36 | 37 |
| 45 | 45 | 47 | 55 | 51 | 33 | 34 | 33 | 37 | 37 |

Fig. 20B

| 40 | 38 | 34 | 35 | 35 | 34 | 35 | 36 | 35 | 34 |
|----|----|----|----|----|----|----|----|----|----|
| 40 | 37 | 38 | 37 | 33 | 34 | 34 | 35 | 36 | 35 |
| 39 | 38 | 35 | 38 | 38 | 33 | 33 | 35 | 36 | 33 |
| 41 | 39 | 39 | 40 | 39 | 32 | 36 | 36 | 34 | 34 |
| 39 | 40 | 40 | 44 | 40 | 40 | 35 | 36 | 37 | 35 |
| 38 | 44 |    |    | 44 | 46 | 35 | 35 | 34 | 35 |
| 43 |    |    |    | 48 | 47 | 36 | 36 | 35 | 36 |
| 43 |    |    |    | 46 | 45 | 36 | 37 | 35 | 38 |
| 44 |    |    |    |    | 45 | 35 | 36 | 36 | 37 |
| 45 | 45 | 47 |    |    | 33 | 34 | 33 | 37 | 37 |

ALTERATION OF 2D SLICE OF A SCNANED VOLUME BY ALTERING DATA UNITS

Fig. 22A

| 40 | 38 | 34 | 35 | 35 | 34 | 35 | 36 | 35 | 34 |
|----|----|----|----|----|----|----|----|----|----|
| 40 | 37 | 38 | 37 | 33 | 34 | 34 | 35 | 36 | 35 |
| 39 | 38 | 35 | 38 | 38 | 33 | 33 | 35 | 36 | 33 |
| 41 | 39 | 39 | 40 | 39 | 32 | 36 | 36 | 34 | 34 |
| 39 | 40 | 40 | 44 | 40 | 40 | 35 | 36 | 37 | 35 |
| 38 | 44 | 52 | 50 | 44 | 46 | 35 | 35 | 34 | 35 |
| 43 | 51 | 51 | 54 | 48 | 47 | 36 | 36 | 35 | 36 |
| 43 | 50 | 54 | 56 | 46 | 45 | 36 | 37 | 35 | 38 |
| 44 | 51 | 53 | 52 | 50 | 45 | 35 | 36 | 36 | 37 |
| 45 | 45 | 47 | 55 | 51 | 33 | 34 | 33 | 37 | 37 |

Fig. 22B

| 40 | 38 | 34 | 35 | 35 | 34 | 35 | 36 | 35 | 34 |
|----|----|----|----|----|----|----|----|----|----|
| 40 | 37 | 38 | 37 | 33 | 34 | 34 | 35 | 36 | 35 |
| 39 | 38 | 35 | 38 | 38 | 33 | 33 | 35 | 36 | 33 |
| 41 | 39 | 39 | 40 | 39 | 32 | 36 | 36 | 34 | 34 |
| 39 | 40 | 40 | 44 | 40 | 40 | 35 | 36 | 37 | 35 |
| 38 | 44 | 70 | 70 | 44 | 46 | 35 | 35 | 34 | 35 |
| 43 | 70 | 70 | 70 | 48 | 47 | 36 | 36 | 35 | 36 |
| 43 | 70 | 70 | 70 | 46 | 45 | 36 | 37 | 35 | 38 |
| 44 | 70 | 70 | 70 | 70 | 45 | 35 | 36 | 36 | 37 |
| 45 | 45 | 47 | 70 | 70 | 33 | 34 | 33 | 37 | 37 |

PREFERRED EMBODIMENT FOR VOLUME RENDERING APPROACH

| Viewing option | Preferred viewing method for volume rendering approach | |
|---|---|---|
| | Normal | Abnormal |
| Filtering option | More | Less or none |
| Transparency adjustment | More | Less |
| Smoothing | More | Less |
| Spatial resolution | Lower | Higher |
| Contrast resolution | Lower | Higher |
| Brightness | Lower $cd/m^2$ | Higher $cd/m^2$ |
| Color | Darker | Brighter |
| Prioritized volume rendering | Non-prioritized | Prioritized |
| Tandem volume rendering | Non-optimized | Optimized |

Figure 24

IMPLEMENTATION OF ENHANCED VIEWING PROCESS OF ABNORMAL PORTIONS USING VOLUME RENDERING TECHNIQUE

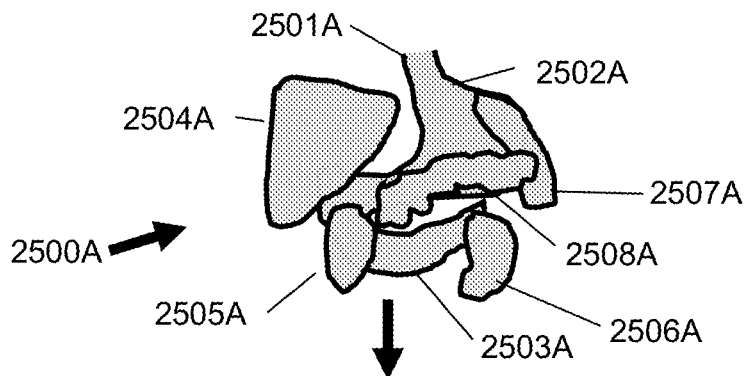

Analyze (e.g., via AI, CAD) the 3D imaging examination to determine which portions of the examination are normal (i.e., all structures except for the pancreas) and which portions of the examination are abnormal (e.g., pancreas in this example)
2509

Process normal portions of the imaging examination using a first methodology (e.g., shown in a partially transparent fashion) and process abnormal portions of the imaging examination using a second methodology (e.g., display in a non-transparent fashion)
2510

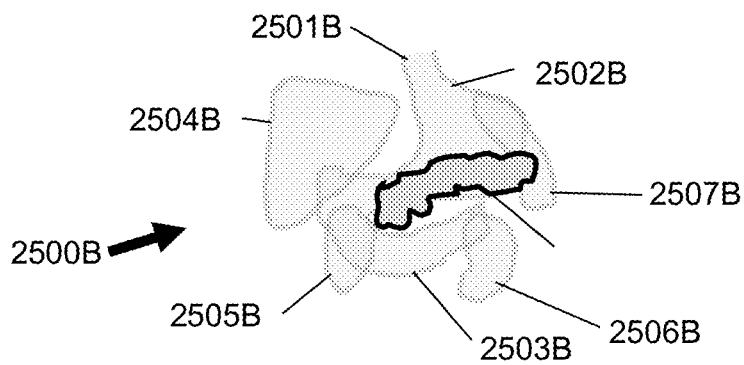

Figure 25

METHOD AND APPARATUS FOR IMPROVED ANALYSIS OF CT SCANS OF BAGS

CROSS-REFERENCES TO RELATED APPLICATIONS

This patent is a continuation in part of U.S. patent application Ser. No. 17/156,583 filed on Jan. 23, 2021, which is a continuation of U.S. patent application Ser. No. 16/703,629 filed on Dec. 4, 2019, which claims priority to PCT/US2019/023968 filed on Mar. 26, 2019, which claims the benefit of U.S. Provisional Application 62/651,934 filed on Apr. 3, 2018, U.S. Provisional Application 62/748,555 filed on Oct. 22, 2018 and U.S. Provisional Application 62/776,234 filed on Dec. 6, 2018.

TECHNICAL FIELD

Aspects of this disclosure are generally related to image processing and more specifically the presentation of images.

BACKGROUND

A CT scan of the abdomen has multiple organs within the field of view, such as the liver, spleen, gallbladder, pancreas, kidneys, adrenal glands, stomach, small bowel and more.

SUMMARY

All examples, aspects and features mentioned in this document can be combined in any technically possible way.

A method, software and apparatus are described to improve security by helping determine whether a bag contains a prohibited item. A CT scan of a bag is performed to generate an image. An artificial intelligence algorithm is performed to classify portions of an image as normal and portions of said image as abnormal. A first type of image processing for said normal portion(s) of said image. A second type of image processing for said abnormal portion(s) of said image wherein said second type of image processing is different from said first type of image processing. The normal portion(s) of the image are displayed with said first type of image processing and said abnormal portion(s) of the image are displayed with said second type of image processing to a TSA Agent for analysis of said image. In the preferred embodiment, the TSA Agent will perform the analysis on an extended reality head display unit.

Some embodiments comprise dividing said image into said normal portion(s) and said abnormal portion(s) via a segmentation algorithm. Some embodiments comprise dividing said image into said normal portion(s) and said abnormal portion(s) via a halo-type modified segmentation algorithm. Some embodiments comprise delineating said abnormal portion(s) via a geometric shape surrounding said abnormal portion(s). Some embodiments comprise wherein said second type of image processing is determined by a danger of said abnormal portion(s). Some embodiments comprise wherein said second type of image processing is determined by a certainty of classification of said abnormal portion(s). Some embodiments comprise displaying normal portion(s) of said image with said first type of image processing and said abnormal portion(s) of said image with said second type of image processing is performed simultaneously. Some embodiments comprise displaying normal portion(s) of said image with said first type of image processing and said abnormal portion(s) of said image with said second type of image processing is performed sequentially. Some embodiments comprise providing a visual marker to notify a user of an abnormal finding as determined by an artificial intelligence algorithm. Some embodiments comprise wherein said visual marker comprises at least one of the group consisting of: an arrow; and a 3D volume cursor. Some embodiments comprise wherein said first type of image processing and said second type of image processing comprise two of the group of: performing a smoothing algorithm; performing windowing and leveling; performing coloring; performing filtering; performing transparency adjustment; performing alteration of spatial resolution; performing alteration of contrast resolution; performing alteration of brightness; performing prioritized volume rendering; and performing tandem volume rendering. Some embodiments comprise wherein said image is viewed on an extended reality display. Some embodiments comprise wherein said image is a CT scan of a bag. Some embodiments comprise wherein said abnormal portion(s) are determined by said artificial intelligence algorithm to be a dangerous item. Some embodiments comprise wherein said abnormal portion(s) are determined by said artificial intelligence algorithm to be a contraband item. Some embodiments comprise wherein said abnormal portion(s) are determined by said artificial intelligence algorithm to be a suspicious/uncertain item. Some embodiments comprise performing analysis of said image by a user.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides steps explained herein that when performed (e.g., when executing) on the processor, operates as explained herein within the computerized device to perform all of the method embodiments and operations explained herein as embodiments of the invention. Thus, any computerized device that performs or is programmed to perform processing explained herein is an embodiment of the invention.

Other arrangements of embodiments of the invention that are disclosed herein include Software programs to perform the method embodiment steps and operations Summarized above and disclosed in detail below. More particularly, a computer program product is one embodiment that has a computer-readable medium including computer program logic encoded thereon that when performed in a computerized device provides associated operations providing steps as explained herein.

The computer program logic, when executed on at least one processor with a computing system, causes the processor to perform the operations (e.g., the methods) indicated herein as embodiments of the invention. Such arrangements of the invention are typically provided as Software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other Such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as Software and hardware, or as hardware and/or circuitry alone. Such as within a data communications device. The features of the invention, as explained herein, may be employed in data processing devices and/or Software systems for Such devices. Note that each of the different features, techniques, configurations, etc. discussed in this disclosure can be executed independently or in combination. Accordingly, the present invention can be embodied and viewed in many different ways. Also, note that this Summary section herein does not specify every embodiment and/or incrementally novel aspect of the present disclosure or claimed invention. Instead, this Summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE FIGURES

The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6 illustrates data for Aided Material Classification (AiMC) software.

FIG. 11A illustrates a CT scan of a bag.

FIG. 11B illustrates an item within the bag, which is viewed via the D3D workstation.

FIG. 16 illustrates visual representation adjustment logic techniques.

FIG. 18 illustrates preferred viewing options for 2D slice-by-slice viewing.

FIG. 20A illustrates a set of pixels of a 2D slice of a scanned volume.

FIG. 20B illustrates a set of pixels of a 2D slice of a scanned volume, of which 14 of the pixels have undergone filtering.

FIG. 22A illustrates a set of pixels of a 2D slice of a scanned volume.

FIG. 22B illustrates a set of pixels of a 2D slice of a scanned volume, of which 14 of the pixels have undergone alteration of data units.

FIG. 24 illustrates the preferred embodiment for the volume rendering approach.

FIG. 25 illustrates implementing the enhance viewing process of abnormal portions using volume rendering technique.

DETAILED DESCRIPTION

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

Figure 1:
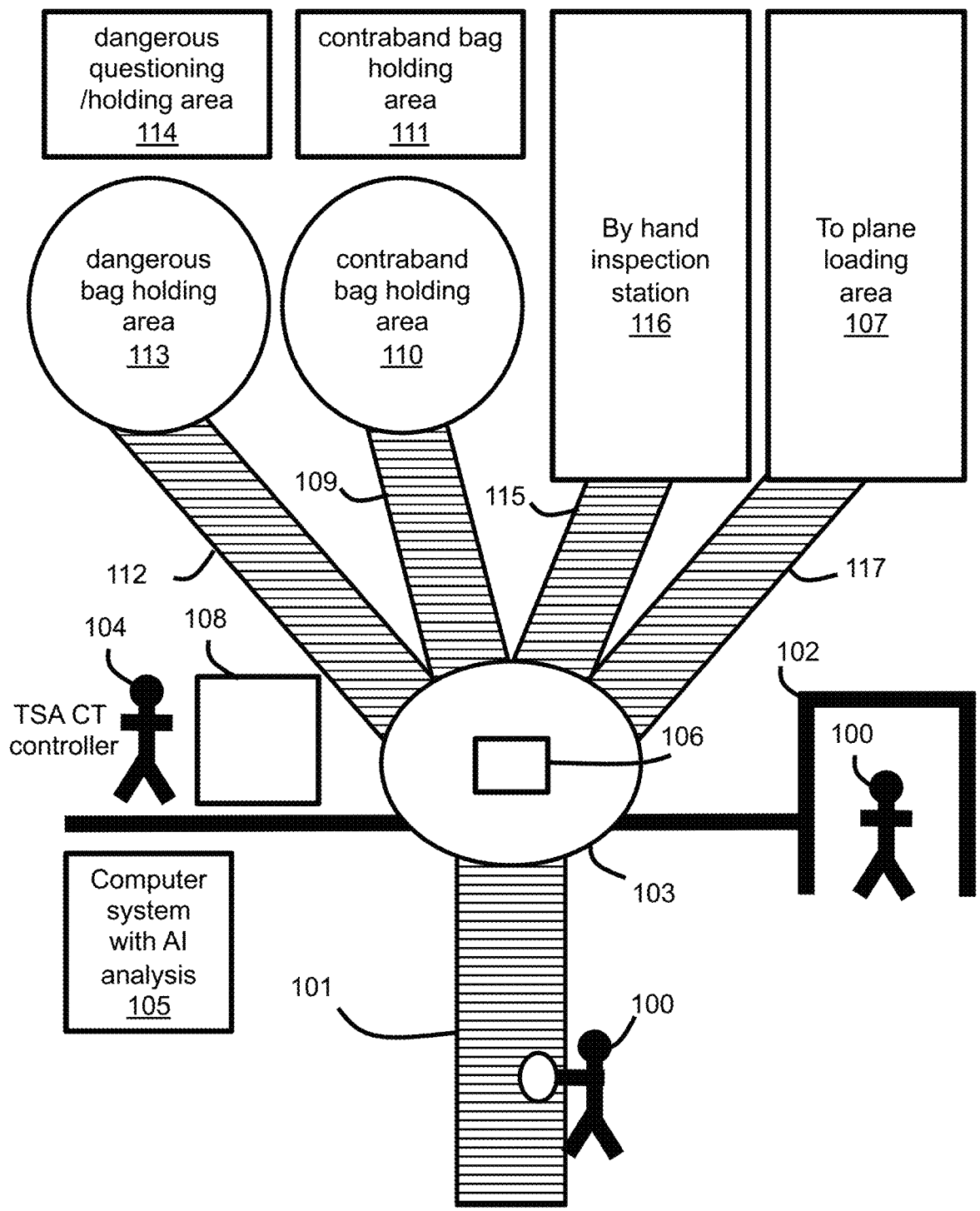
FIG. 1 depicts an example layout of the CT area, construction of the 3D volume, segmentation and Aided Material Classification (AiMC)/artificial intelligence (AI) computation center, holding and inspection areas, and bag transport system.

FIG. 1 depicts an example layout of the TSA CT area, construction of the 3D volume, segmentation and AiMC/AI computation center, holding and inspection areas, and bag transport system. This figure provides an overview of how a CT scanner with advanced image analysis can help determine whether there is a prohibited item within a bag. Passenger 100 arrives with his/her bag(s) at the inspection area and when it is his/her turn, takes bag(s) and paces it in the bag transport mechanism 101. From there he/she would proceed to the passenger scan mechanism 102 to be scanned and thence to a waiting area where he/she would await the decision on the bag((s). Given a declaration the bag(s) was safe, the passenger 100 would proceed to the boarding area. If the bag(s), however, were deemed dangerous or containing contraband, the passenger 100 would be apprehended and taken to a closed area for questioning holding for legal authorities. Note that if the passenger 100 has multiple bags, each bag would be treated individually sequenced thru the CT scanning process and, after the bag was placed on the bag transport mechanism, it would automatically be transported to the CT scanner 103. The TSA CT Operator 104 would ensure the bag was optimally positioned for scanning within the CT scanner 103 at which time the TSA CT Operator 104 would initiate the scanning process. The CT data would be sent to a centralized computational area 105 which would be sized such that multiple CT areas within the airport could be served simultaneously and provide near real time responses to the various TSA CT Operators 104. Note an alternative would be a cloud based might be selected if it were more cost effective and could provide the required tasks at near real time speed. At this computational location 105, the segmentation and AMC/AI processes would be performed. Upon completion of the segmentation and AMC/AI processes, instructions would be sent to the TSA CT Operator 104 regarding disposition of the bag leaving the CT scanner 103. If the bag 106 was deemed to be safe, the bag would be sent to the aircraft loading area 107 and the passenger 100 in the passenger waiting area released to go to the boarding area. If the TSA CT Operator 104 were notified the bag 106 was deemed suspicious/uncertain, then the bag 106 would be forwarded to the TSA Inspector 104. If the bag 106 were deemed to contain dangerous or contraband material, the TSA CT Operator's monitor 108 would flash and alarm sounded to ensure that the TSA Operator 104 was fully aware of the serious situation at hand. The TSA CT Operator 104 would then forward the bag 106 to the corresponding holding area(s) and ensure the bag was properly secured. If the bag 106 was determined to contain contraband, then the bag 106 would be delivered via bag transport mechanism 109 to the contraband bag holding area 110 and the passenger 100 would be held in the contraband holding area 111. If the bag 106 was determined to contain dangerous items, then the bag 106 would be delivered via bag transport mechanism 112 to the dangerous items holding area 113 and the passenger 100 would be held in the dangerous questioning/holding area 114. Then, he/she would notify the legal authorities and also notify other TSA personnel who would go to the passenger holding area to detain and escort the passenger who owns the bag to the area(s) set aside for questioning and possible detention. The TSA Inspector 104 would, at this juncture, have access the segmented 3D volume data of the bag's contents. The TSA Inspector 104 would don a stereoscopic headset and, using the controller element, filter the bag's contents such that only the suspicious/uncertain contents remained. After filtration, the TSA Inspector would carefully inspect the remaining contents in the by rotating, zooming, displacement, as required to make a virtual determination. If a virtual determination were not possible, the bag 106 would be delivered via bag transport mechanism 115 to the by hand inspection station 116. The TSA Inspector 104 could perform a hands-on inspection at the by hand inspection station 116. If the TSA inspector 104 deemed the contents were safe, the bag would be sent on its way to the aircraft baggage loading area 107 and the passenger notified they were free to go to the aircraft boarding area. Based on the 'hands on inspection', actions would be taken as appropriate for: dangerous, of contraband contents. Finally, if the bag 106 were deemed safe with no suspicious/uncertain item, no contraband item and no dangerous item, then the bag 106 would be delivered via bag transport mechanism 117 to the aircraft baggage loading area 107 where passenger 100 could retrieve the bag and head to the gate and board the aircraft.

Figure 2:
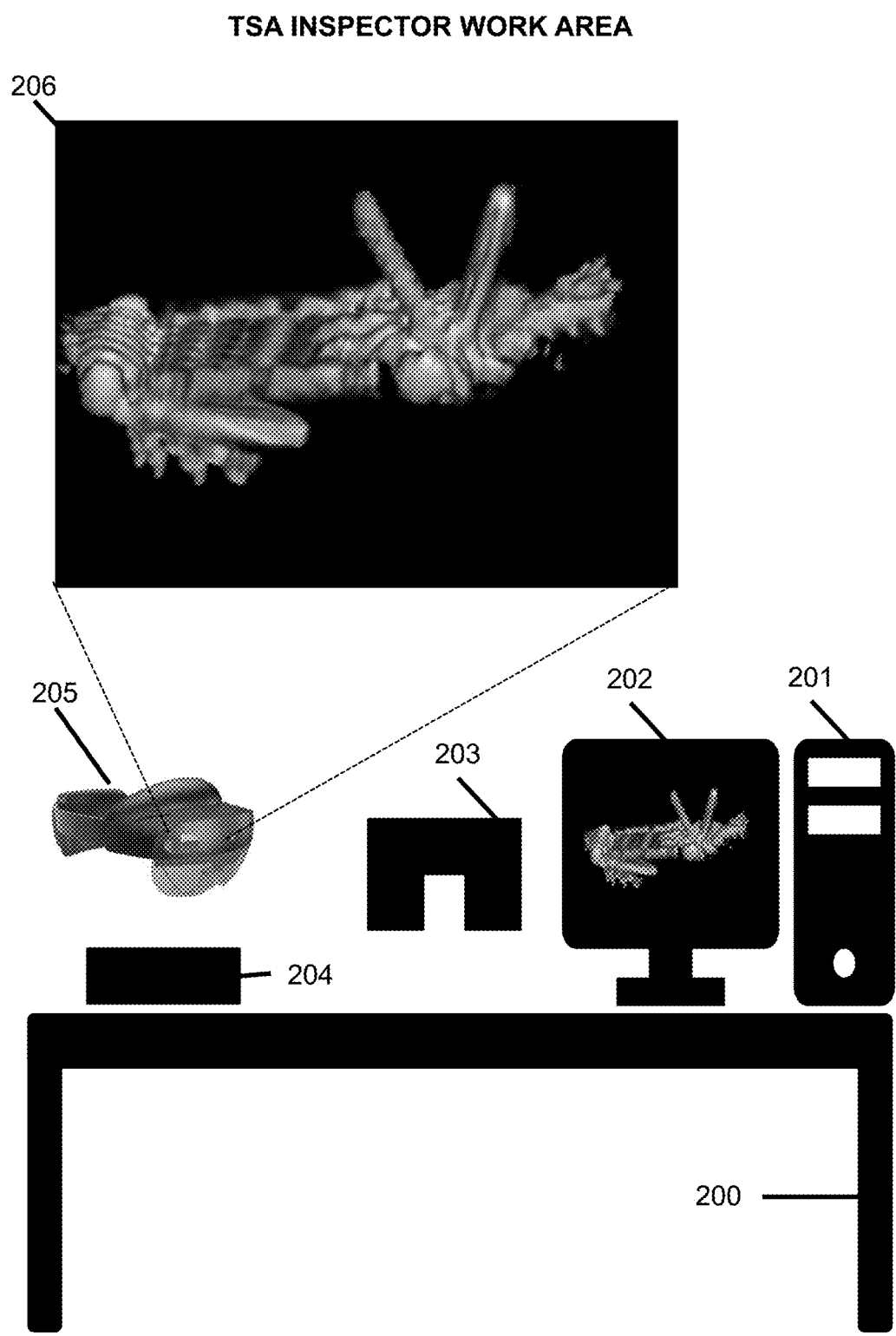
FIG. 2 illustrates the TSA inspector work area.

FIG. 2 illustrates the TSA inspector work area. 200 illustrates a table. 201 illustrates a computer. 202 illustrates a 2D monitor. 203 illustrates a controller. 204 illustrates a geo-registered tool, such as a platform. The geo-registered tool is described in U.S. Pat. No. 10,712,837, USING GEO-REGISTERED TOOLS TO MANIPULATE THREE-DIMENSIONAL MEDICAL IMAGES, which is incorporated by reference in its entirety. 205 illustrates an extended reality display, such as a HoloLens 2 display. 206 illustrates an enlarge images inside of the right eye display, which when worn by a TSA agent would be aligned with the right eye of a TSA agent.

Figure 3:
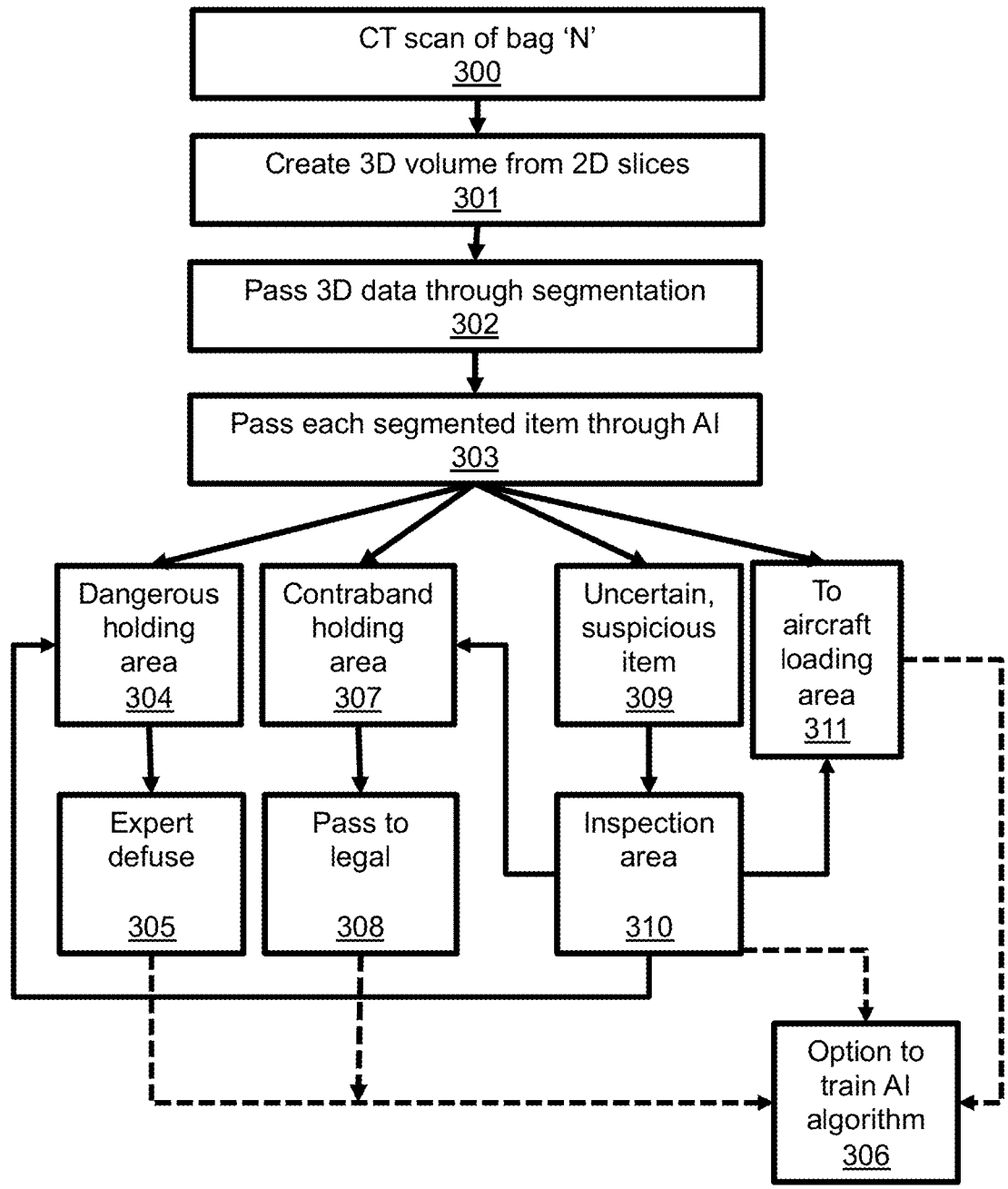
FIG. 3 provides a flow chart of the envisioned of the CT imaged 3D bag inspection process.

FIG. 3 provides a flow chart of the envisioned of the CT imaged 3D bag inspection process. The bag currently undergoing inspection is labeled 'Bag N' to connote this is a continuous operation and we are now at the $N^{th}$ bag in the sequence of bags. The bag is placed on the platform for CT scanning in a position for best 3D viewing (e.g., on the bag rollers for a broadside view of bag contents). 300 illustrates a CT scan performed on 'Bag N'. 301 illustrates automatically construct a 3D volume out of the CT 2D slices in the CT data set. This is done through the process outlined in USPTO Patent 8,384,771.302 illustrates wherein the 3D volume data sent through a segmentation process. This process will segregate normal and safe travel items from one another inter alia: clothing items from toiletries; jewelry from shoes; cell phones from computers. It will also isolate potential contraband such as but not limited to: stacks of cash from books; clusters of diamonds from metal objects. It will also isolate potential weapons such as but not limited to: box cutters from nail clippers; Swiss Army knife from assorted Allen wrenches; knives from common tools. 303 illustrates wherein each of the individually segmented items are run through an automatic classification process which could include inter alia Aided Material Classification (AiMC) software or Artificial Intelligence (AI) software. Useful attributes or characteristics of these individually segmented items include but, are not limited to the following: Hounsfield Units (HU); size and shape of the item; positioning within the bag; relationship to other items within the bag. Rationale for using HUs is that HUs can significantly aid in the classification process. For example, clothing which would be classified as 'safe' typically has a negative value in the range of −50 to −100. These clothing items could, in later steps, be filtered from viewing to make the process more efficient. In contrast, dangerous materials such as dangerous explosives C4 or nitro glycerin may have unique HUs which would quickly be recognized as 'dangerous' and be classified accordingly. Size and shape are also valuable classification aids. We all recognize the shape of a knife and pistol but, are they large enough to be a real threat of merely a small toy replica. Position within the bag can be important. For example, a knife next to the aluminum frame of the bag would appear very dark on a typical 2d display so a knife taped to the bag frame would not be distinguishable whereas the segmentation process would readily separate the two through the higher density of the steel in the knife (and higher HU) than aluminum. Relationship to other items within the bag can also be an important indicator. Consider wires connecting some package containing an unidentifiable substance with a circular metal object—possible a timing device. Next, distribute segmented and classified items into multiple categories. For example, categories include: dangerous; contraband; suspicious/uncertain; and safe. Items considered dangerous could include but, would not be limited to the following: substances identified as explosives; weapons or parts of weapons that could readily connected; and ammunition. For bags containing items classified as dangerous—the bag would be identified to the TSA CT Operator in some manner such as flashing red signal on the operator's monitor, flashing red light, and/or audio signal. At this juncture, the TSA CT Operator takes immediate action in accordance with DHS policy. These actions could include but, would not be limited to the following: segregate the bag and move it to secure location 304 away from passengers so as to not endanger them; apprehend the bag's owner for detailed questioning and possible detainment; perform a 'by hand examination' by a demolition or weapons expert to disarm 305 the dangerous and/or secure weapon(s). Items classified as contraband could include but, would not be limited to the following: large amounts of cash or diamonds drugs of any such as bricks of marijuana, cocaine, etc. An option at this juncture is to pass the 3D volume (or segmented structure) to a training dataset to improve the AI algorithm 306. For bags containing items classified as containing contraband— the bag would be identified to the operator in some manner such as flashing yellow signal on the TSA CT Operator's monitor, flashing yellow light, and/or distinct audio signal. At this juncture, the TSA CT Operator takes immediate action in accordance with DHS policy. These actions could include but, are not limited to the following: segregate and move the bag to secure location 307 away from passengers so as to preserve the evidence; apprehend the bag's owner for detailed questioning retention as considered appropriate. Notify police/criminal investigation authorities 308 whose personnel who could go to the secure location and retrieve the bag. An option at this juncture is to pass the 3D volume (or segmented structure) to a training dataset to improve the AI algorithm 306. Items classified as suspicious/uncertain could include a wide array of objects or combination of objects which were not identifiable by the AiMC or AI. Item(s) classified as suspicious/uncertain would undergo a detailed inspection process by an operator 309 at an inspection area 310 which would include but not be limited to the following steps: send bag to an inspection area wherein trained inspector would perform the following tasks: filter non suspicious/uncertain items from the bag leaving only suspicious/uncertain item(s); the trained TSA Inspector would then, using a 3D headset, perform a detailed inspection of the suspicious/uncertain item(s); the trained operator could zoom in on the item(s); rotate the items; separate and displace item(s); manipulate items such as rotating elements of a Swiss Army knife; disassembling and discarding safe portions of a box cutter; virtually slice open an ammunition clip to see if there is ammunition inside; virtually cut open an object wrapped in aluminum foil to see if the HU of the contents therein match the HU of marijuana. There is a myriad of items that could be inside that could cause the bag to be classified as suspicious/uncertain—these are but a few. An option at this juncture is to pass the 3D volume (or segmented structure) to a training dataset to improve the AI algorithm 306. Given no resolution of the suspicious/uncertain by the TSA Inspector, the bag would be sent to the area for a 'by hand examination' by trained inspector. If the bag passes this inspection, the bag is delivered to the aircraft loading area. If not, depending on whether the inspector deemed the bag dangerous or containing contraband, the bag would be to the correct area for disposition. For the next bag: go to Step 300 for CT scan of Bag 'N+1'.

Figure 4:
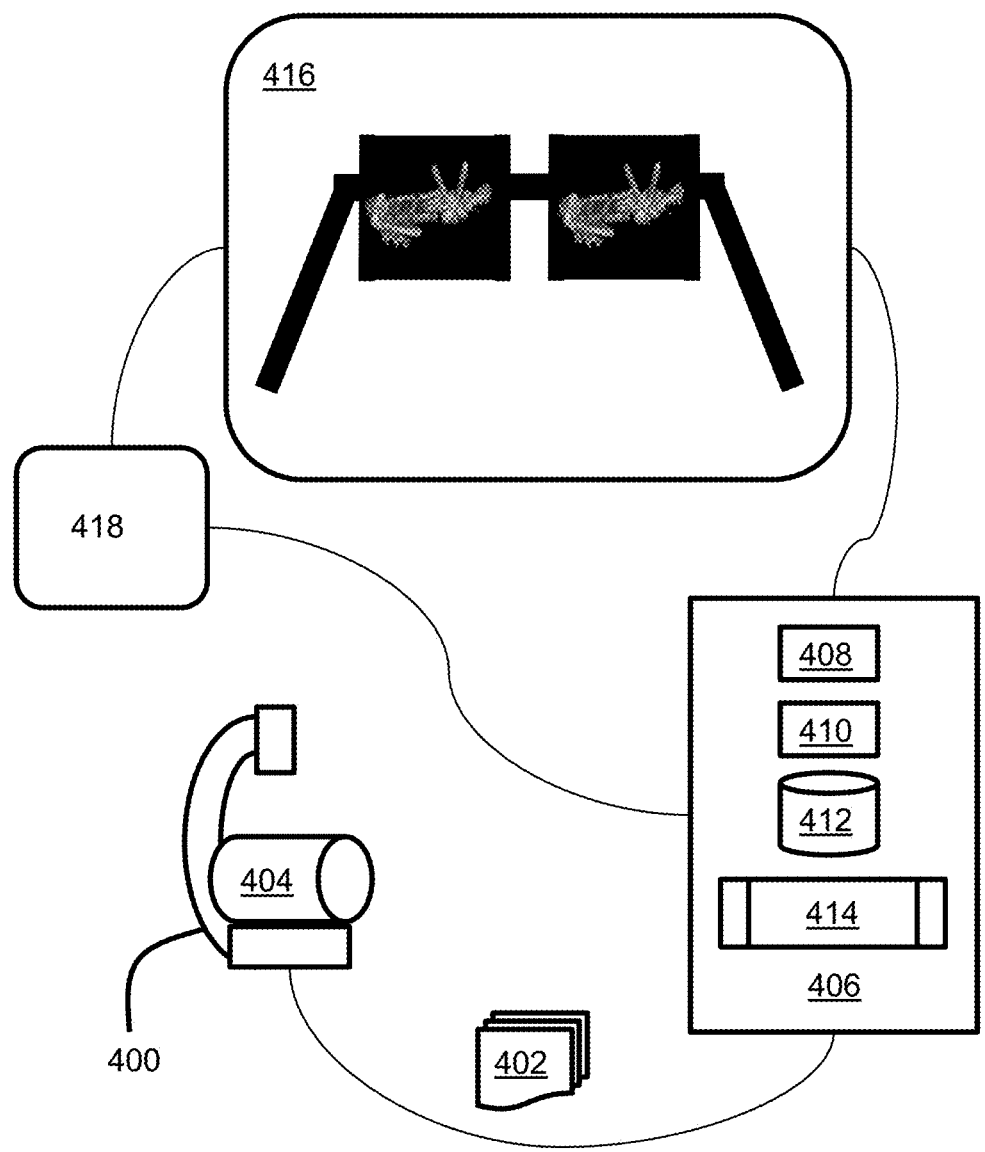
FIG. 4 illustrates an overview of this invention.

FIG. 4 illustrates an overview of this invention. A baggage CT scanner 400 is used to generate 2D image slices 402 of a bag 404. The 2D image slices 402 are provided to an image processor 406, that includes processors 408 (e.g., CPUs and GPUs), volatile memory 410 (e.g., RAM), and non-volatile storage 412 (e.g., HDDs and SSDs). A program 414 is run the image processor for image processing (to optimize the image for human analysis) and also for AI image analysis. Processed images are displayed on an IO device 416. The IO device may include an extended reality display (e.g., mixed reality, virtual reality or augmented reality headset), monitor, tablet computer, PDA (personal digital assistant), mobile phone, or any of a wide variety of devices, either alone or in combination. The IO device may include a touchscreen, and may accept input from external devices (represented by 118) such as a keyboard, mouse, joystick, geo-registered tool, and any of a wide variety of equipment for receiving various inputs. However, some or all the inputs could be automated, e.g., by the program 414.

Figure 5:
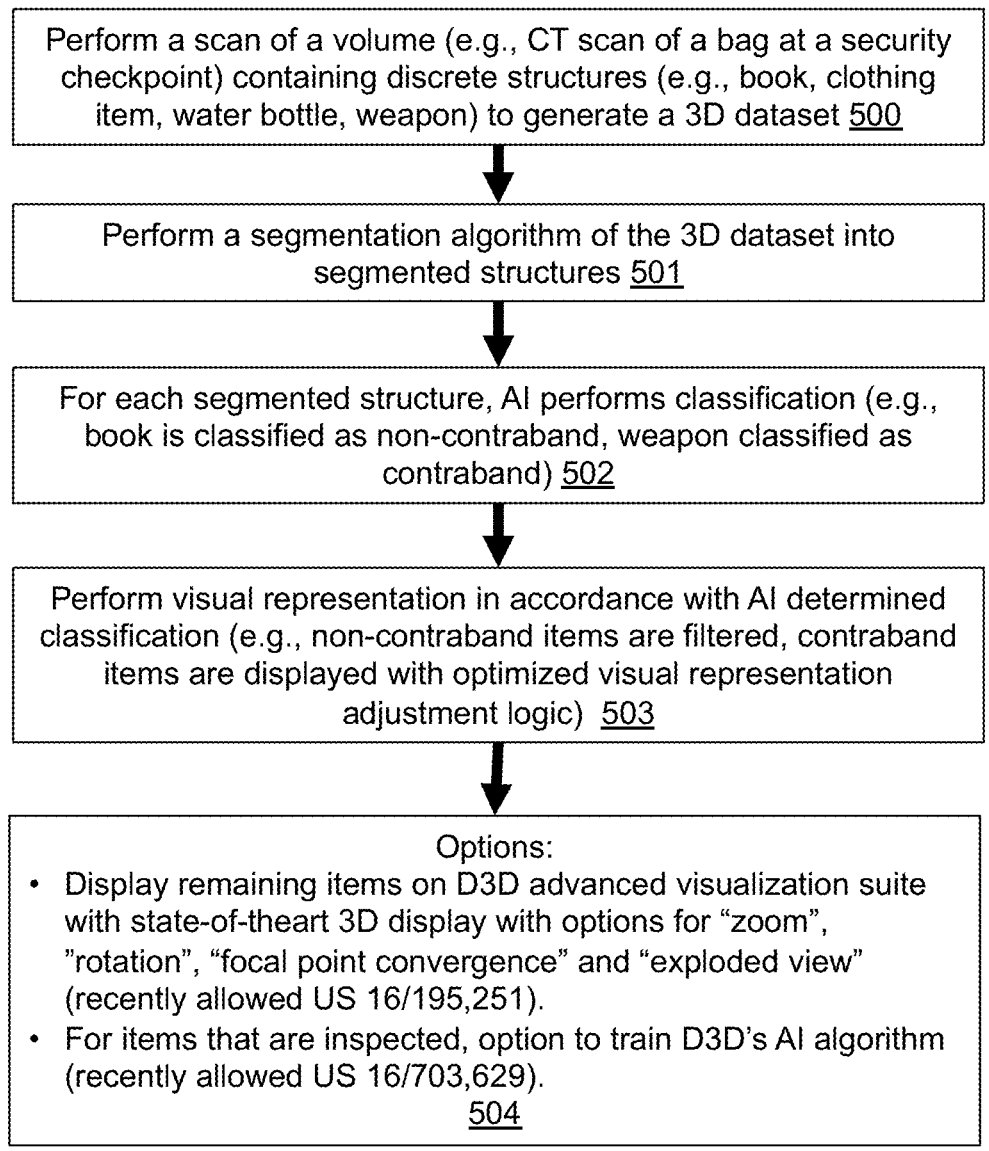
FIG. 5 illustrates an efficient review process by optimizing viewing of only the abnormal items within a bag.

FIG. 5 illustrates an efficient review process by optimizing viewing of only the abnormal items within a bag. In 500, perform a scan of a volume (e.g., CT scan of a bag at a security checkpoint) containing discrete structures (e.g., book, clothing item, water bottle, weapon) to generate a 3D dataset. In processing block 501, perform a segmentation algorithm of the 3D dataset into segmented structures. A segmentation algorithm can be performed based on the difference in data units (e.g., Hounsfield Units) between an item of concern and an item of non-concern. For example, consider the following algorithm. A thresholding technique to define the boundary of a structure. First, the mean and standard deviation of Hounsfield Units of a structure will be determined. Next, a threshold (e.g., 3 standard deviations) will be set and then applied. A growing algorithm from the center of an object outward will be performed. A center point of the object will be selected. If a voxel away from the center is within the threshold, then it will be characterized as the suspicious object. If a voxel exceeds the threshold (e.g., the 3 standard deviations), then this voxel will be characterized as external to the object. This growing algorithm will be applied on each 2D image slice. Multiple threshold presets can be developed. The threshold selected (e.g., the number of standard deviations) will depend on the mean density of the suspicious item. In other words, a first threshold can be applied for a high density object (e.g., metal). A second threshold can be applied for a medium density object (e.g., water). A third threshold can be applied for a low density object (e.g., clothing). Each preset will be used for threshold based segmentation algorithms wherein the delineation of an object from the adjacent surrounding structures is based on the difference between the data units of an object from the adjacent structure. In processing block 502, for each segmented structure, AI performs classification (e.g., book is classified as non-contraband, weapon classified as contraband). AI techniques including deep learning can be implemented. A large amount of training data is needed. Techniques as taught in US patent application, RADIOLOGIST ASSISTED MACHINE LEARNING, which is incorporated by reference in its entirety. In processing block 503, for each segmented structure, perform visual representation in accordance with AI determined classification. In the preferred embodiment, non-contraband items are filtered and contraband items are displayed with optimized visual representation adjustment logic. This will de-clutter the image and result in more efficient analysis and also improved assessment of contraband items.

It is known that filtering (subtracting some portions of a volume) is extremely beneficial because it helps improve an area of interest within the volume. This is taught in U.S. Pat. No. 8,384,771, METHOD AND APPARATUS FOR THREE DIMENSIONAL VIEWING OF IMAGES, which is incorporated by reference in its entirety. Without any filtering, a volume rendered image would be uninterpretable and non-diagnostic. Even with adequate filtering, a volume rendered image on a 2D display can be difficult to interpret and of limited diagnostic utility because of overlapping structures. In this section, three different filtering algorithms for rapid sub-volume delineation will be discussed. These three algorithms will be used in combination to achieve the fastest possible speed while maintaining the highest accuracy. Minimizing false negatives will directly improve safety of air travel.

First is performing filtering by voxel property (U.S. Pat. No. 8,384,771). The human body is a relatively consistent structure. Water (such as cerebrospinal fluid) has a Hounsfield Unit of 0. Fat has a Hounsfield Unit of −100. Muscle has a Hounsfield Unit of +40. Bone has a Hounsfield Unit of +200. Fairly predictable and fairly consistent across the population. A similar set of analysis can be generated for contraband items.

In some situations, it is possible to yield a good quality image by segmenting a structure and filtering (subtracting) of all voxels in the volume not pertaining to the segmented structure. In other words, segmenting "A" and subtracting all voxels not pertaining to "A".

In some situations, however, filtering all "non-A" could yield false negatives. An example is a contraband item hidden inside of a non-contraband item. Consider a metal box may be filled with sand, rocks and bullets wherein the density of the metal box is equal to that of the bullet. Assume an accurate segmentation of the metal box ("A") was performed and assume that all "non-A" items were subtracted. The bullets being a "non-A" item would therefore be subtracted, which would result in a false negative. Thus, "non-A" type filtering can quickly yield a 3D view of object "A", but can result in false negatives. To prevent these such errors, D3D performs filtering by data unit (i.e., Hounsfield Unit) in conjunction with segmentation rather than just subtracting all "non-A" items. Knowledge of Hounsfield Units is critical because this will allow precision filtering of non-contraband items and display of contraband items.

The range(s) of Hounsfield Units to be unfiltered (i.e., displayed) and the range(s) of Hounsfield Units to be filtered (i.e., subtracted) will be preset (based on the training datasets) and the 3D volume is processed accordingly. Each item will be segmented in the training datasets. We will segment and determine the mean and standard deviation Hounsfield Units for each of the items. We will then develop our presets so that the TSA agent will be able to display or hide certain items. For example, the TSA agent could select "display metal" or "hide water". The viewing process will be in 3D, as detailed below.

Second is performing filtering by voxel location ("3D volume cursor" as taught in U.S. Pat. Nos. 9,980,691 and 10,795,457, both of which are incorporated by reference in their entirety). Our "3D volume cursor" is essentially a box that can move anywhere inside of the 3D volume dataset. Currently, the 3D cursor can be changed in size by a "grab and pull" maneuver with hand-held controllers to change the height, depth or width of the box. Once the 3D volume cursor has been positioned and sized, all tissues outside of the 3D cursor can be filtered (i.e., subtracted). The 3D volume cursor is effective in because it performs rapid and accurate viewing of a sub-volume unhindered by tissues of non-interest. The cursor can be controlled by hand held controllers (e.g., Oculus Rift-S controllers).

With respect to shapes, a TSA Agent might see a round object and wonder is it a baseball or an apple or an explosive. The TSA Agent could click on the center of the item and select a round 3D volume cursor and subtract the items outside of the 3D volume cursor. This would allow the TSA agent to view the round item in closer detail. The stitches of the ball or 3D shape of the apple could then be inspected in 3D.

With respect to measurement markings, the D3D advanced visualization suite offers zooming so that a small item the size of a baseball can be enlarged to appear the size of a waste basket. The zoom feature is critical for image interpretation, but must be accompanied with a measurement marking system. We propose incorporating a measurement marking system. This can be used by a TSA Agent to assess size limitations (e.g., length) of an object.

Third, filtering by a "conformal boundary method" as taught in U.S. patent application Ser. No. 16/785,606, IMPROVING IMAGE PROCESSING VIA A MODIFIED SEGMENTED STRUCTURE, which is incorporated by reference in its entirety. In this algorithm, we perform segmentation of an object in attempt to delineate the exact boundary of the object. Then, we add at least one (but typically several) layer(s) of voxels to the external surface of the segmented object. It should be noted that the layers are added irrespective of the Hounsfield Units. This process creates a "bubble" or "halo" appearance around a segmented structure.

Within 0.5 seconds of the TSA agent's selection, the customized D3D software will automatically perform segmentation and filtering. As soon as the TSA Agent selects the suspicious item, the suspicious item will appear on the 3D display unhindered by other items of non-interest. D3D features include zoom, rotate and focal point convergence in near real time with a minimum of 60 Hz frame rate (prevents nausea).

Processing block 504 illustrates a range of viewing options.

For example, the images could be display on the D3D advanced visualization suite with state-of-the-art 3D display with options for "zoom", "rotation", "focal point convergence" and "exploded view", which is described in U.S. Pat.

No. 10,878,639, INTERACTIVE VOXEL MANIPULATION IN VOLUMETRIC MEDICAL IMAGING FOR VIRTUAL MOTION, DEFORMABLE TISSUE, AND VIRTUAL RADIOLOGICAL DISSECTION, which is incorporated by reference in its entirety.

For items that are inspected, option to train D3D's AI algorithm, which is taught in U.S. Ser. No. 16/703,629, RADIOLOGIST-ASSISTED MACHINE LEARNING WITH INTERACTIVE, VOLUME SUBTENDING 3D CURSOR, which is incorporated by reference in its entirety.

In some embodiments, stereoscopic viewing of the 3D volume is performed on an extended reality display unit, which is described in U.S. Pat. No. 8,384,771, METHOD AND APPARATUS FOR THREE DIMENSIONAL VIEWING OF IMAGES, which is incorporated by reference in its entirety. This patent teaches image processing techniques including volume generation, filtering, rotation, and zooming.

In some embodiments, stereoscopic viewing of the 3D volume is performed with convergence, which is described in U.S. Pat. No. 9,349,183, METHOD AND APPARATUS FOR THREE DIMENSIONAL VIEWING OF IMAGES, which is incorporated by reference in its entirety. This patent teaches shifting of convergence. This feature can be used in combination with filtering.

In some embodiments, stereoscopic viewing can be performed using a display unit, which incorporates polarized lenses, which is described in U.S. Pat. No. 9,473,766, METHOD AND APPARATUS FOR THREE DIMENSIONAL VIEWING OF IMAGES, which is incorporated by reference in its entirety.

In some embodiments, advancements to display units can be incorporated for viewing the 3D volume, which are taught in U.S. patent application Ser. No. 16/828,352, SMART GLASSES SYSTEM and U.S. patent application Ser. No. 16/997,830, ADVANCED HEAD DISPLAY UNIT FOR FIRE FIGHTERS, which are both incorporated by reference in their entirety.

In some embodiments, advancements in display units are taught in U.S. patent application Ser. No. 17/120,109, ENHANCED VOLUME VIEWING, which is incorporated by reference in its entirety. Included herein is a head display unit, which is improved by incorporating geo-registration.

Some embodiments comprise utilizing an improved field of view on an extended reality head display unit, which is taught in U.S. patent application Ser. No. 16/893,291, A METHOD AND APPARATUS FOR A HEAD DISPLAY UNIT WITH A MOVABLE HIGH RESOLUTION FIELD OF VIEW, which is incorporated by reference in its entirety.

In some embodiments, image processing steps can be performed using a 3D volume cursor, which is taught in U.S. Pat. No. 9,980,691, METHOD AND APPARATUS FOR THREE DIMENSIONAL VIEWING OF IMAGES, and U.S. Pat. No. 10,795,457, INTERACTIVE 3D CURSOR, both of which are incorporated by reference in its entirety.

In some embodiments, a precision sub-volume can be utilized in conjunction with the 3D volume, which is taught in U.S. patent application Ser. No. 16/927,886, A METHOD AND APPARATUS FOR GENERATING A PRECISION SUB-VOLUME WITHIN THREE-DIMENSIONAL IMAGE DATASETS, which is incorporated by reference in its entirety.

In some embodiments, viewing of a structure at two different time points can be performed using a ghost imaging technique, which is taught in U.S. Pat. No. 10,864,043, INTERACTIVE PLACEMENT OF A 3D DIGITAL REPRESENTATION OF A SURGICAL DEVICE OR ANATOMIC FEATURE INTO A 3D RADIOLOGIC IMAGE FOR PRE-OPERATIVE PLANNING, which is incorporated by reference in its entirety.

Some embodiments comprise selecting a specific surgical device for pre-operative planning, which is taught in U.S. patent application Ser. No. 17/093,322, A METHOD OF SELECTING A SPECIFIC SURGICAL DEVICE FOR PREOPERATIVE PLANNING, which is incorporated by reference in its entirety.

Some embodiments comprise advanced image processing techniques available to the user of the 3D volume, which are taught in U.S. Pat. No. 10,586,400, PROCESSING 3D MEDICAL IMAGES TO ENHANCE VISUALIZATION, and U.S. Pat. No. 10,657,731, PROCESSING 3D MEDICAL IMAGES TO ENHANCE VISUALIZATION, both of which are incorporated by reference in its entirety.

Some embodiments comprise performing voxel manipulation techniques so that portions of the 3D volume can be deformed and move in relation to other portions of the virtual 3D mannequin, which is taught in U.S. patent application Ser. No. 16/195,251, INTERACTIVE VOXEL MANIPULATION IN VOLUMETRIC MEDICAL IMAGING FOR VIRTUAL MOTION, DEFORMABLE TISSUE, AND VIRTUAL RADIOLOGICAL DISSECTION, which is incorporated by reference in its entirety.

Some embodiments comprise generating at least some portions of the 3D volume through artificial intelligence methods and performing voxel manipulation thereof, which is taught in U.S. patent application Ser. No. 16/736,731, RADIOLOGIST-ASSISTED MACHINE LEARNING WITH INTERACTIVE, VOLUME SUBTENDING 3D CURSOR, which is incorporated by reference in its entirety.

Some embodiments comprise wherein at least some component of the inserted 3D dataset into the 3D volume are derived from cross-sectional imaging data fine-tuned with phantoms, which is taught in U.S. patent application Ser. No. 16/752,691, IMPROVING IMAGE QUALITY BY INCORPORATING DATA UNIT ASSURANCE MARKERS, which is incorporated by reference in its entirety.

Some embodiments comprise utilizing halo-type segmentation techniques, which are taught in U.S. patent application Ser. No. 16/785,606, IMPROVING IMAGE PROCESSING VIA A MODIFIED SEGMENTED STRUCTURE, which is incorporated by reference in its entirety.

Some embodiments comprise using techniques for advanced analysis of the 3D volume taught in U.S. patent application Ser. No. 16/939,192, RADIOLOGIST ASSISTED MACHINE LEARNING, which are incorporated by reference in its entirety.

Some embodiments comprise performing smart localization from a first 3D volume to a second 3D volume, such as in an anatomy lab, which is performed via techniques taught in U.S. patent application Ser. No. 17/100,902, METHOD AND APPARATUS FOR AN IMPROVED LOCALIZER FOR 3D IMAGING, which is incorporated by reference in its entirety.

Some embodiments comprise displaying the 3D volume in an optimized image refresh rate, which is taught in U.S. patent application Ser. No. 16/842,631, A SMART SCROLLING SYSTEM, which is incorporated by reference in its entirety.

Some embodiments comprise displaying the 3D volume using priority volume rendering, which is taught in U.S. Pat. No. 10,776,989, A METHOD AND APPARATUS FOR PRIORITIZED VOLUME RENDERING, which is incorporated by reference in its entirety.

Some embodiments comprise displaying the 3D volume using tandem volume rendering, which is taught in U.S. Ser. No. 17/033,892, A METHOD AND APPARATUS FOR TANDEM VOLUME RENDERING, which is incorporated by reference in its entirety.

Some embodiments comprise displaying images in an optimized fashion by incorporating eye tracking, which is taught in U.S. patent application Ser. No. 16/936,293, IMPROVING VISUALIZATION OF IMAGES VIA AN ENHANCED EYE TRACKING SYSTEM, which is incorporated by reference in its entirety.

Some embodiments comprise enhancing collaboration for analysis of the 3D volume by incorporating teachings from U.S. patent application Ser. No. 17/072,350, OPTIMIZED IMAGING CONSULTING PROCESS FOR RARE IMAGING FINDINGS, which is incorporated by reference in its entirety.

Some embodiments comprise improving multi-user viewing of the 3D volume by incorporating teachings from U.S. patent application Ser. No. 17/079,479, AN IMPROVED MULTI-USER EXTENDED REALITY VIEWING TECHNIQUE, which is incorporated by reference in its entirety.

Some embodiments comprise improving analysis of images through use of geo-registered tools, which is taught in U.S. Pat. No. 10,712,837, USING GEO-REGISTERED TOOLS TO MANIPULATE THREE-DIMENSIONAL MEDICAL IMAGES, which is incorporated by reference in its entirety.

Some embodiments comprise integration of virtual tools with geo-registered tools, which is taught in U.S. patent application Ser. No. 16/893,291, A METHOD AND APPARATUS FOR THE INTERACTION OF VIRTUAL TOOLS AND GEO-REGISTERED TOOLS, which is incorporated by reference in its entirety.

FIG. 6 illustrates data for Aided Material Classification (AiMC) software. In the left column, there are two groups of materials. The first group illustrates non-contraband items including air, water, clothing, aluminum, book, silver and gold. The second group illustrates contraband items including C4, ammonium nitrate fertilizer, dynamite, fuel oil and cash. The second column illustrates the Hounsfield units for each of these items. This data is needed for accurate material classification. Some data is known from, for example, in the medical field. Air has a Hounsfield Unit of −1000. Water has a Hounsfield Unit of 0. Aluminum has a Hounsfield Unit of 2,200. Silver has a Hounsfield Unit of 17,000. Gold has a Hounsfield unit of 30,000. Other materials have unknown Hounsfield units and these can be determined via material classification procedures and then used in analysis to improve detection.

Figure 7A:
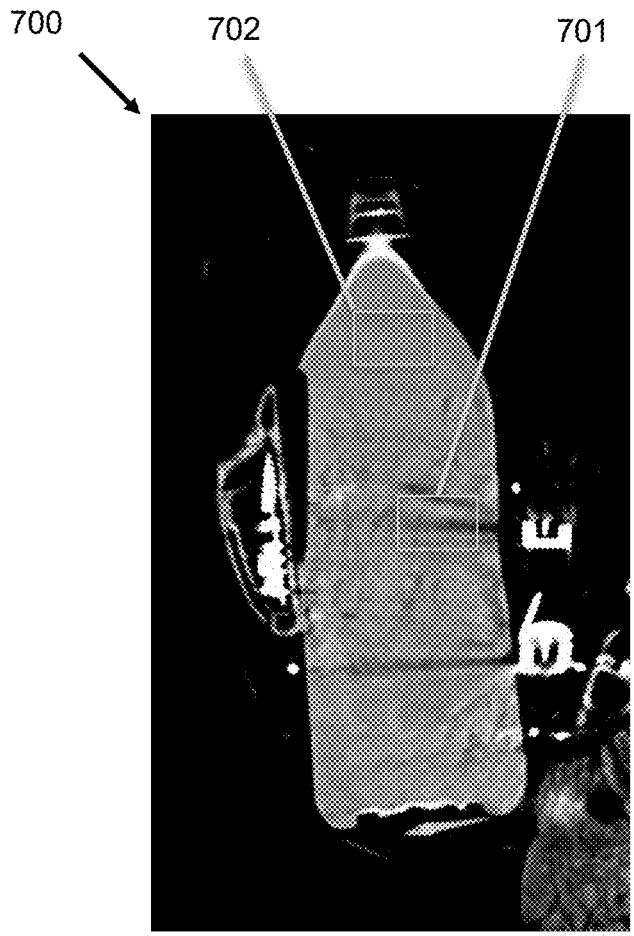
FIG. 7A illustrates where to measure Hounsfield Units within a material to ensure highest possible accuracy.
Figure 7B:
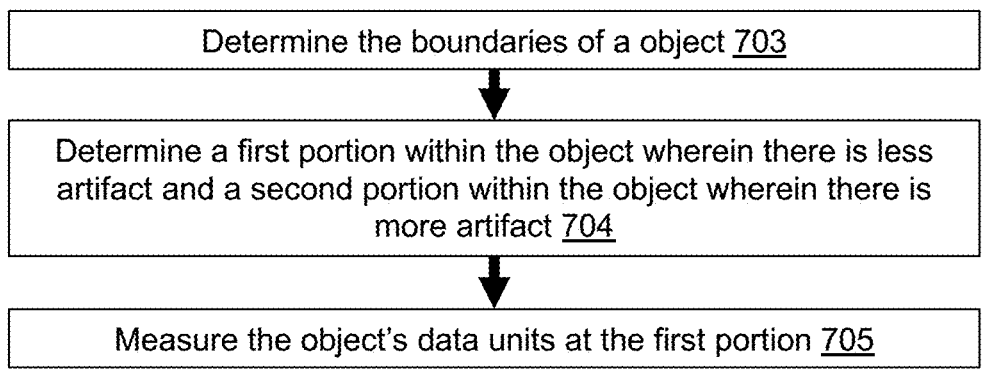
FIG. 7B illustrates a process to determine where to measure Hounsfield Units to ensure accurate classification of materials.

FIG. 7A illustrates where to measure Hounsfield Units within a material to ensure highest possible accuracy. The Aided Material Classification (AiMC) software determines the type of material (e.g., water) based on the Hounsfield Unit (e.g., Hounsfield Unit of 0). 700 illustrates an image. 701 illustrates a region within the image wherein measurement of Hounsfield Units would result in inaccurate classification of the object. 702 illustrates a region within the image wherein measurement of Hounsfield Units would result in accurate classification of the o FIG. 7B illustrates a process to determine where to measure Hounsfield Units to ensure accurate classification of materials. Processing block 703 illustrates determining the boundaries of an object. This can be achieved through segmentation algorithms, such as is discussed in FIG. 5 processing block 501. Processing block 704 illustrates determining a first portion within the object wherein there is less artifact and a second portion within the object wherein there is more artifact. A common source of artifact is beam hardening and streak artifact. These types of artifact occur mostly in the axial plane and can cause the Hounsfield units to be artificially increased or artificially decreased. If for example, a material is homogeneous (e.g., water), a region of interest (e.g., circle, 3D volume cursor) would show a larger standard deviation in this region because there would be some areas of artifact, which erroneously increase or decrease the Hounsfield Units, such as is shown in region of interest 701 in FIG. 7A. For a homogeneous material, a large standard deviation is indicative of more artifact and a small standard deviation is indicative of less artifact. These areas where artifact is detected would not be used for material classification. So, a first portion within the object where there is less artifact would correspond to 702 in FIG. 7A and a second portion where there is more artifact would correspond to 701 in FIG. 7A. Several regions of varying size could be measured for more accurate measurement. Processing block 705 illustrates measuring the object's data units at the first portion. These would be used to determine which material is inside of the segmented object. This could be done by finding the row in FIG. 6 with the closest match to the measured Hounsfield unit from the second column and then moving to the first column to determine the most likely material. For example, if the Hounsfield Units of a material were 0, then the material would be classified as water. In addition, method of data unit assurance can also be incorporated to improve classification accuracy by correcting for such artifacts. These methods are discussed in U.S. Ser. No. 16/752,691, IMPROVING IMAGE QUALITY BY INCORPORATING DATA UNIT ASSURANCE MARKERS, which is incorporated by reference in its entirety.

Figure 8:
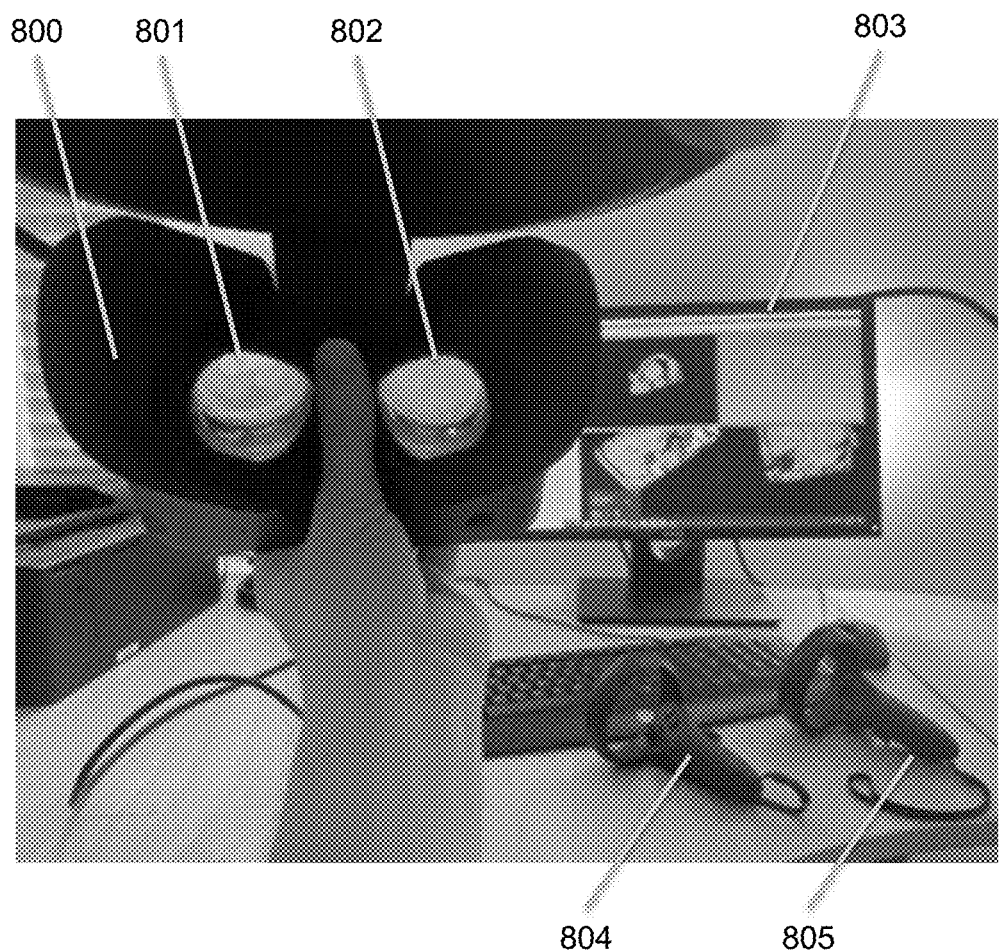
FIG. 8 illustrates the preferred viewing method for the CT scans of the baggage, which is via an extended reality display.

FIG. 8 illustrates the preferred viewing method for the CT scans of the baggage, which is via an extended reality display. Note that the left eye image is aligned with the left eye of the user. The D3D Advanced Visualization Suite could be used for analysis of the contents of a range of objects in a non-invasive manner. Applications include analysis of the contents of: a bag; a bomb; a suitcase; a car; and, an airplane. 800 illustrates a head display unit, which is the Oculus Rift-S in this example. 801 illustrates the left eye display, which when worn by the TSA agent would be aligned with the TSA agent's left eye. 802 illustrates the right eye display, which when worn by the TSA agent would be aligned with the TSA agent's right eye. 803 illustrates a 2D monitor. 804 illustrates a left hand controller. 805 illustrates a right hand controller. U.S. patent application Ser. No. 16/195,251 (recently allowed) teaches 3D dataset deformation of a scanned volume. This technology will enable creating an exploded view of the contents of items within a bag (e.g., virtually separating closely packed items within luggage). The separated digital objects will be subsequently arranged on a table to improve examination of contraband. Third, D3D will prepare automated contraband recognition software to assist operators identify particular types of contraband. To perform this, a Picture Archiving Communication System (PACS) system will be utilized to continuously train its artificial intelligence (AI) algorithm. This patented technique called "radiologist assisted machine learning" utilizes a sub-volume training technique to improve classification. This will allow TSA Agents to receive feedback from AI, and train the AI, and adjudicate differences when they occur.

Figure 9A:
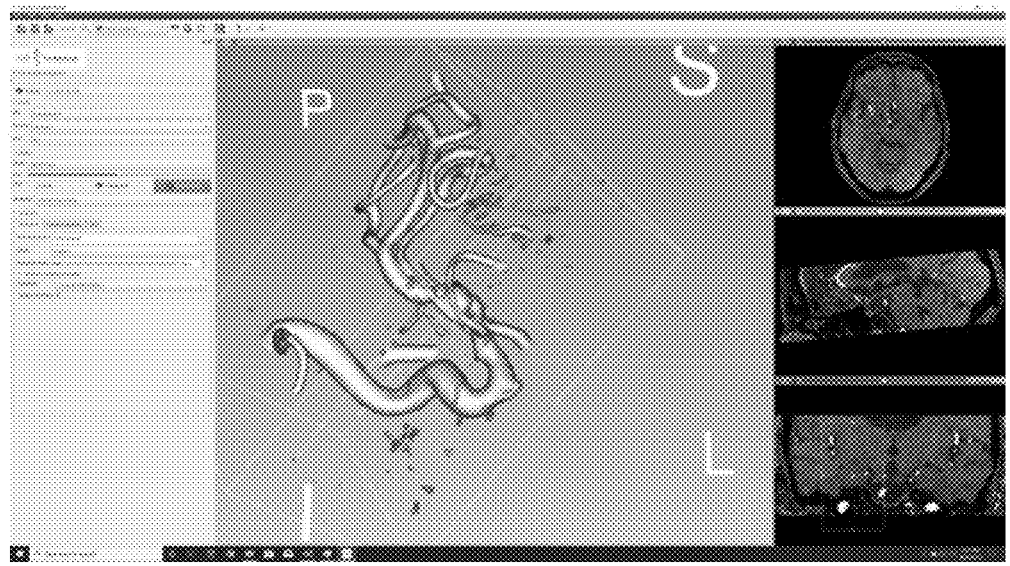
FIG. 9A illustrates a 3D volume cursor which is used for advanced analysis.

FIG. 9A illustrates a 3D volume cursor which is used for advanced analysis. This 3D volume cursor is described in U.S. Pat. No. 9,980,691, METHOD AND APPARATUS FOR THREE DIMENSIONAL VIEWING OF IMAGES, which is incorporated by reference in its entirety. The margins of the 3D volume cursor are shown in the white border. Note that voxels external to the 3D cursor have been subtracted. This technique is applied to enhance viewing of an item within a bag.

Figure 9B:
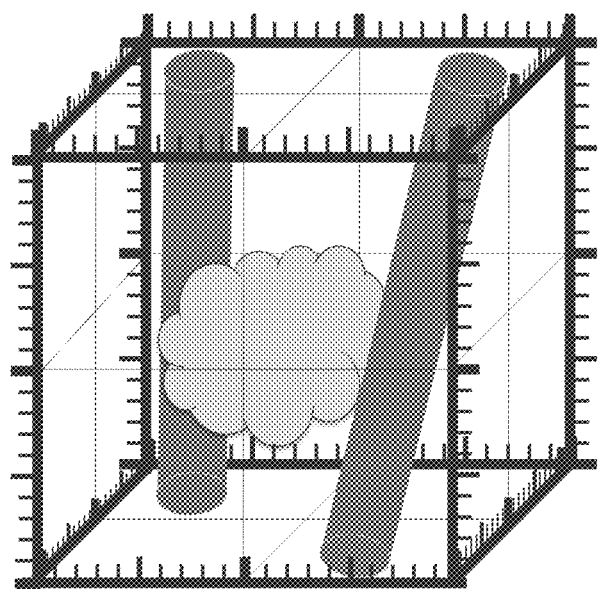
FIG. 9B illustrates the improvements to the 3D volume cursor.

FIG. 9B illustrates the improvements to the 3D volume cursor. As described in U.S. Pat. No. 8,384,771, METHOD AND APPARATUS FOR THREE DIMENSIONAL VIEWING OF IMAGES, which is incorporated by reference in its entirety, an item within the volume can be zoomed to be as large as a waste basket or as small as a coin. This technique provides opportunities to improve visualization of small objects within a bag. Note that hash marks are shown along the borders of the 3D cursor, which provide context as to the size during enlarging or shrinking of an item.

Figure 10:
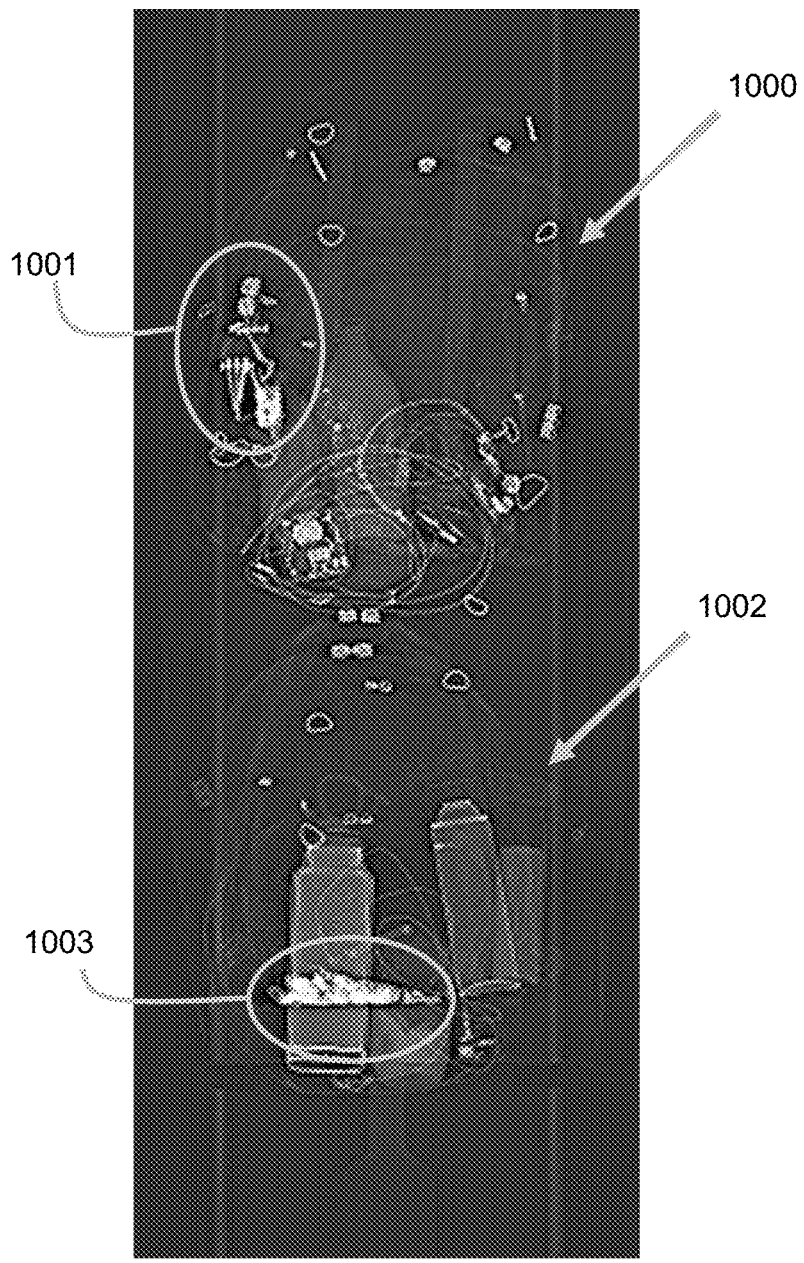
FIG. 10 illustrates a scout 2D image performed of a CT scan of two bags.

FIG. 10 illustrates a scout 2D image performed of a CT scan of two bags. Some of the items are difficult to characterize via the 2D images. For example, see item 1001 in the oval circle in the first bag 1000 and item 1003 in the oval circle in the second bag 1002. What exactly is item 1001? What exactly is item 1003?

FIG. 11A illustrates a CT scan of a bag. Illustration of the problem of classification of an object using 2D imaging. What is the object inside of the oval 1100? It is difficult for most observers to characterize this object with a high level of certainty.

FIG. 11B illustrates an item within the bag, which is viewed via the D3D workstation. Note that the process in FIG. 5 has been applied. Note that all items have been removed except the item inside of the oval 1100 in FIG. 11A. This object can be viewed with D3D viewing, which includes a 3D view with rotation, zooming, convergence and other features. This technology can be applied to multiple fields including radiology, TSA security checkpoints and other fields as well. For example, many airport security checkpoints are being upgraded from x-ray to CT (e.g., Analogic's CT baggage scanner). Currently, CT scans of baggage are viewed on 2D monitors. D3D's patented technology presents CT scans on state-of-the-art 3D displays with head tracking for immersive, stereoscopic viewing. Compared with 2D monitors, advanced 3D visualization suites on 3D displays have proven faster and more accurate for brain aneurysms diagnosis. First, a CT scan of a bag is performed (e.g., performed on an Analogic CT baggage scanner) to generate the 3D dataset. Second, a segmentation algorithm is performed. The 3D dataset of the bag will be segmented into discrete items (e.g., clothing, wrist watch, book, Allen wrench, bottle of water, etc.). Third, an analysis (e.g., via AI, CAD) of the CT scan is performed. The preferred embodiment is for the AI to (1) determine whether it is normal or abnormal and (2) determine the confidence of classification. Is the segmented structure both (1) normal and (2) a high confidence (e.g., >99% confident)? If yes, then process using a first methodology (e.g., filter), which is shown in this example. If no, then process using a second methodology (e.g., display using optimized methodology). In this example, AI system determines that item 1100 is either (1) abnormal or (2) normal but the confidence is less than or equal to 99% and it is therefore it is divided into the second portion. All remaining items in this example were classified as normal and >99% confidence (or certainty) and were therefore divided into the first portion. Note that in some embodiments, three or more groups could be utilized. Fourth, in this example, the abnormal portions the presentation is via D3D viewing methods and the 3D representation of the digital object is shown with a first view of the digital object 1101, a second view of the digital object 1102 and a third view of the digital object 1103. The actual object is shown in the bottom row with a first view of the tangible object 1104 which is similar to the first view of the digital object 1101, a second view of the tangible object 1005 which is similar to the second view of the digital object 1002, a third view of the tangible object 1006 which is similar to the third view of the digital object 1103. As a user views the digital object using the D3D imaging technique, he/she will appreciate that the digital object is an Allen wrench. Note that the item can be deformed and further inspected using techniques as described in U.S. Pat. No. 10,878,639, which is incorporated by reference in its entirety. Note that the normal and >99% confidence (or certainty) and were filtered (i.e., subtracted). This second type of processing (e.g., filtering in this example) of normal portions of a large, complex dataset is useful because it improves analysis of the abnormal portions. Items of non-interest are filtered thereby improving visual analysis of a suspicious item, which will include a combination of three techniques. A variety of filtering techniques can be implemented. First, a filtering by data unit strategy will automatically eliminate items (e.g., clothing) known to be non-hazardous. Next, a filtering by 3D volume cursor strategy, our software will automatically position, size and shape the 3D volume cursor and then eliminate items external to the 3D volume cursor. Next, a "conformal boundary method" of filtering, our software will form a halo surrounding an item and automatically eliminate items external to the halo. These techniques will be performed using a "hands off" filtering strategy will eliminate the burden of manual image processing steps for TSA Agents. Three views are shown (segmentation, filtering and rendering performed). Images on displayed via a 3D virtual reality headset or augmented reality headset.

Figure 12:
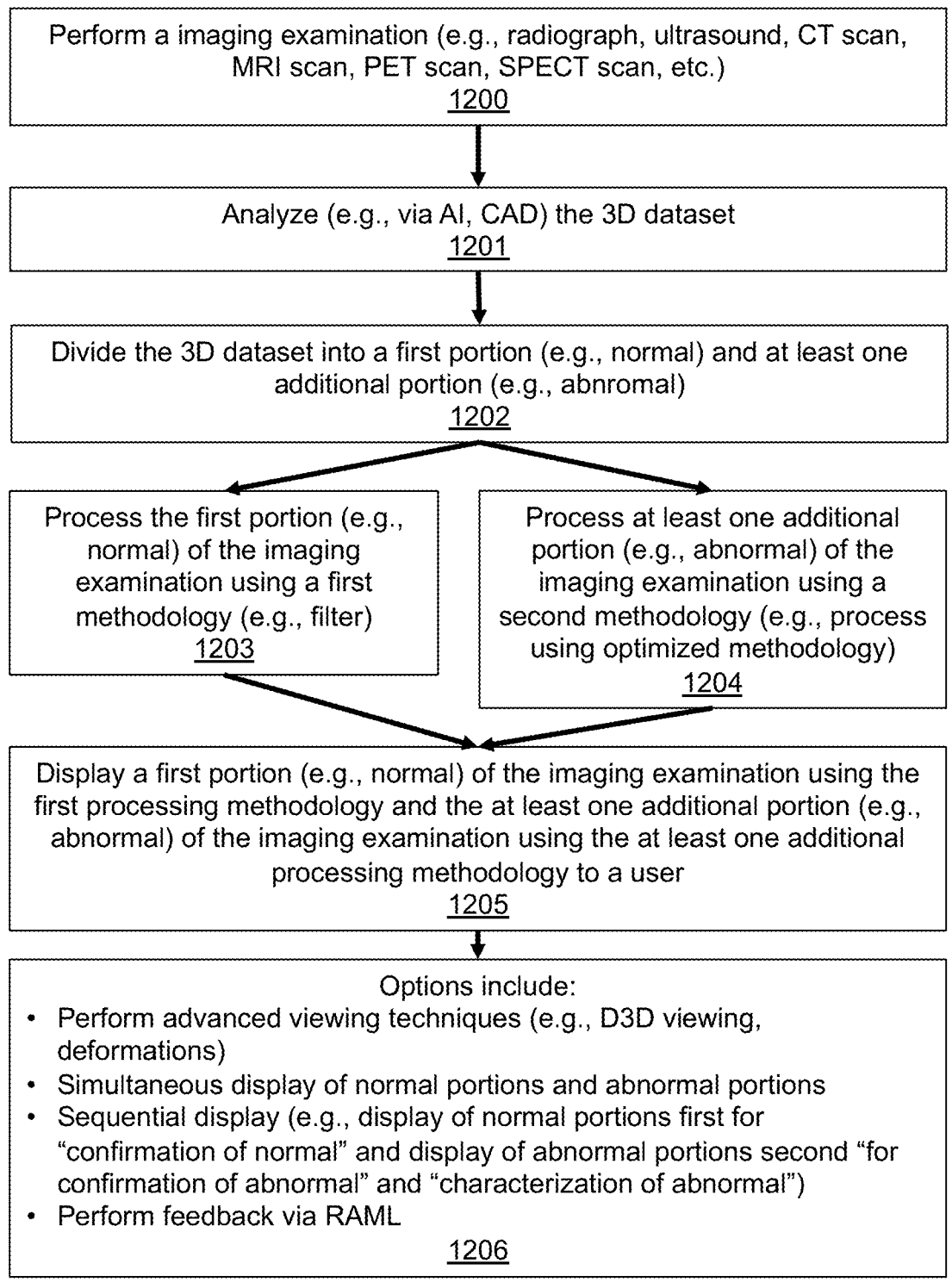
FIG. 12 illustrates a flow diagram to teach the method and process for this invention.

FIG. 12 illustrates a flow diagram to teach the method and process for this invention. 1200 illustrates performing a 3D imaging examination (e.g., CT scan, MM scan, PET scan, SPECT scan, etc.). 1201 illustrates analyzing (e.g., via AI, CAD) the 3D imaging examination to determine which portions of the examination are normal and which portions of the examination are abnormal. The preferred embodiment is for the AI to analyze a structure and determine whether it is normal or abnormal. If the AI determines that it is normal with a high amount of certainty, then the item is filtered (subtracted). 1202 illustrates dividing the normal portions and abnormal portions. More specifically, delineate the boundaries of normal portions and abnormal portions. 1203 illustrates processing normal portions of the imaging examination using a first methodology (e.g., filter). 1204 illustrates processing abnormal portions of the imaging examination using a second methodology (e.g., display using optimized methodology). 1205 illustrates displaying normal portions of the imaging examination using the first processing methodology and the abnormal portions of the imaging examination using the second processing methodology to a user. The preferred technique for this portion of the invention is described in U.S. Pat. No. 10,586,400, PROCESSING 3D MEDICAL IMAGES TO ENHANCE VISUALIZATION, which is incorporated by reference in its entirety. 1206 illustrates a processing block describing additional options. First, normal portions and abnormal portions can be sequentially displayed or simultaneously displayed. In the event that they are sequentially displayed, the normal portions can be displayed first to a user (e.g., radiologist). The radiologist would look through the images and if agreed with the AI, then this process would confirm that the structures that were thought to be normal by the AI were actually normal as confirmed by the radiologist. When, this occurs, this is called "confirmation of normal". Additionally, techniques described in U.S. patent application Ser. No. 16/703,629, RADIOLOGIST-ASSISTED MACHINE LEARNING WITH INTERACTIVE, VOLUME SUBTENDING 3D CURSOR, which is incorporated by reference in its entirety, can be performed.

Figure 13:
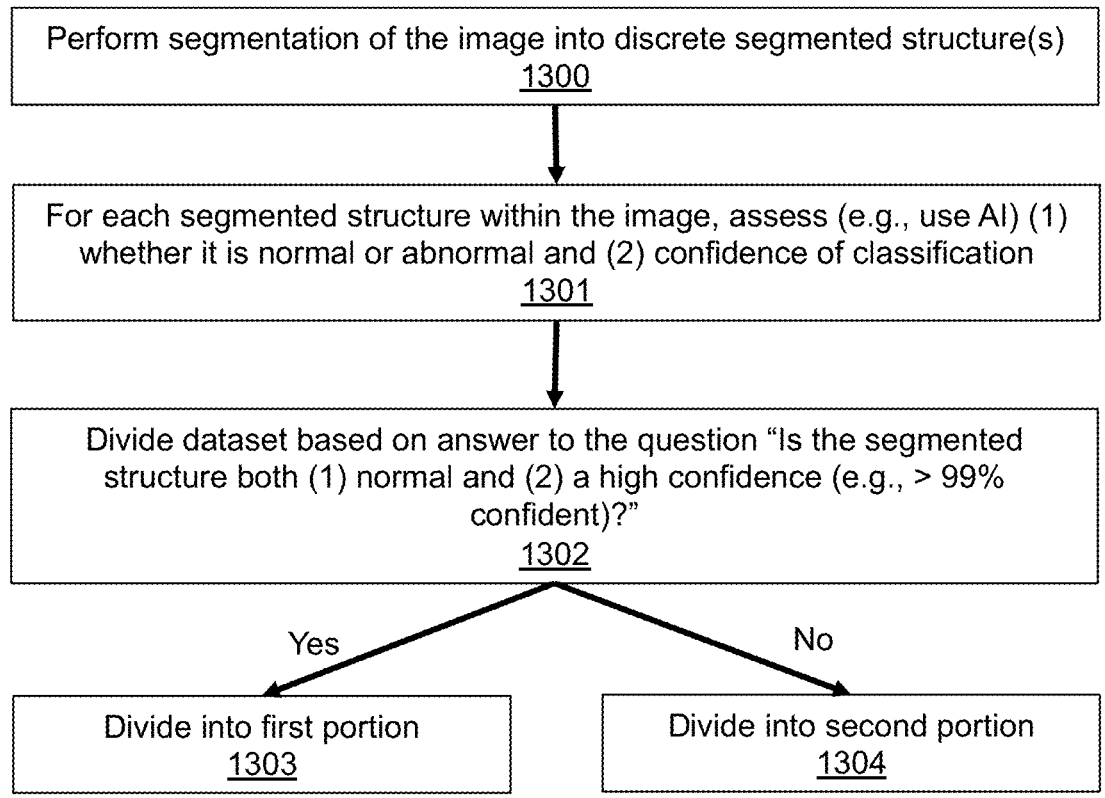
FIG. 13 illustrates how to divide the dataset into normal portions and abnormal portions.

FIG. 13 illustrates how to divide the dataset into normal portions and abnormal portions. 1300 illustrates a processing block of "perform segmentation of the image into discrete segmented structure(s)". 1301 illustrates a processing block of "for each segmented structure within the image, assess (e.g., use AI) (1) whether it is normal or abnormal and (2) confidence of classification". 1302 illustrates a processing block of divide dataset based on answer to the question "Is the segmented structure both (1) normal and (2) a high confidence (e.g., >99% confident)?" 1303 illustrates a processing block that occurs when the answer to the question in processing block 1302 is yes, which divides the volume into a first portion. 1304 illustrates a processing block that occurs when the answer to the question in processing block 1302 is no, which divides the volume into a second portion. Note that in accordance with FIG. 11B, the first portion is processed according to the first technique and the second portion is processed according to the second technique.

Figure 14:
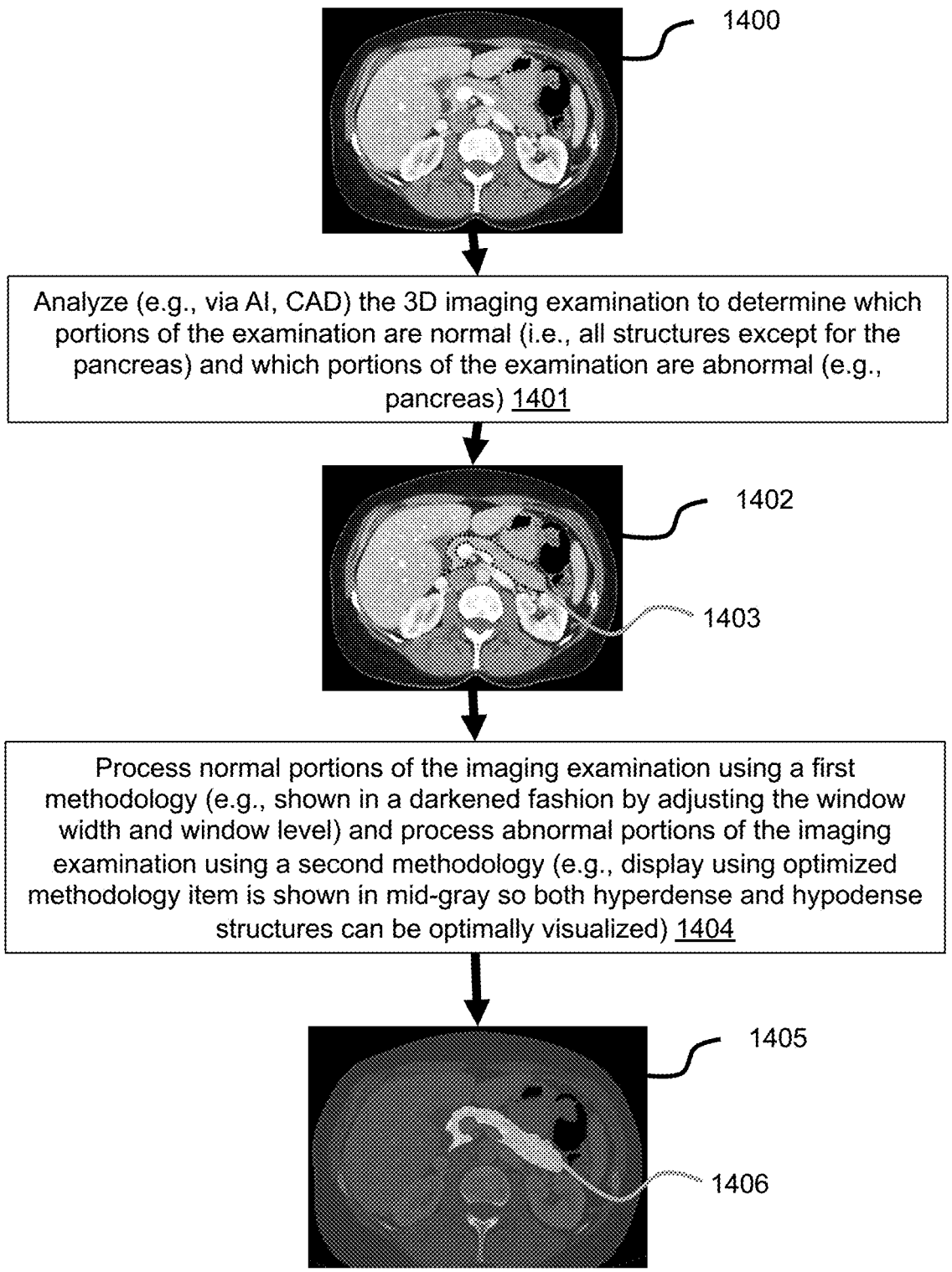
FIG. 14 illustrates an example of using an artificial intelligence algorithm, segmentation and a double windowing technique in combination to optimize an image.

FIG. 14 illustrates an example of using an artificial intelligence algorithm, segmentation and a double windowing technique in combination to optimize an image. 1400 illustrates a CT scan of the abdomen, which includes the pancreas. 1401 illustrates a processing block of analyze (e.g., via AI, CAD) the 3D imaging examination to determine which portions of the examination are normal (i.e., all structures except for the pancreas) and which portions of the examination are abnormal (e.g., pancreas in this example). 1402 illustrates an image wherein the portion, which is going to be processed with the special technique (i.e., different from the rest) is outlined with a dotted line 1403. Note that the AI determined that something was abnormal in the pancreas. Note that the entire pancreas was segmented, as shown in 1403. 1404 illustrates processing normal portions of the imaging examination using a first methodology (e.g., shown in a darkened fashion by adjusting the window width and window level) and process abnormal portions of the imaging examination using a second methodology (e.g., display using optimized methodology item is shown in mid-gray so both hyperdense and hypodense structures can be optimally visualized). This "double windowing" technique is described in U.S. Pat. No. 10,586,400, PROCESSING 3D MEDICAL IMAGES TO ENHANCE VISUALIZATION, which is incorporated by reference in its entirety. 1405 illustrates an enhanced image. Note that the pancreas 1406, which was determined to be abnormal by an artificial intelligence algorithm to be abnormal is optimally displayed and the portions that were determined to be normal (all portions of the image other than the pancreas) are displayed in a way that is darkened. This is useful because it would optimize visualization of the abnormal portions and not be a distractor to a user. Note that the normal portions (displayed sub-optimally in a darkened viewing) and the abnormal portions (displayed optimally) are shown in a simultaneous fashion to the user. Other techniques, which can be implemented include US patent application U.S. patent application Ser. No. 16/785,606, IMPROVING IMAGE PROCESSING VIA A MODIFIED SEGMENTED STRUCTURE, which is incorporated by reference in its entirety.

Figure 15:
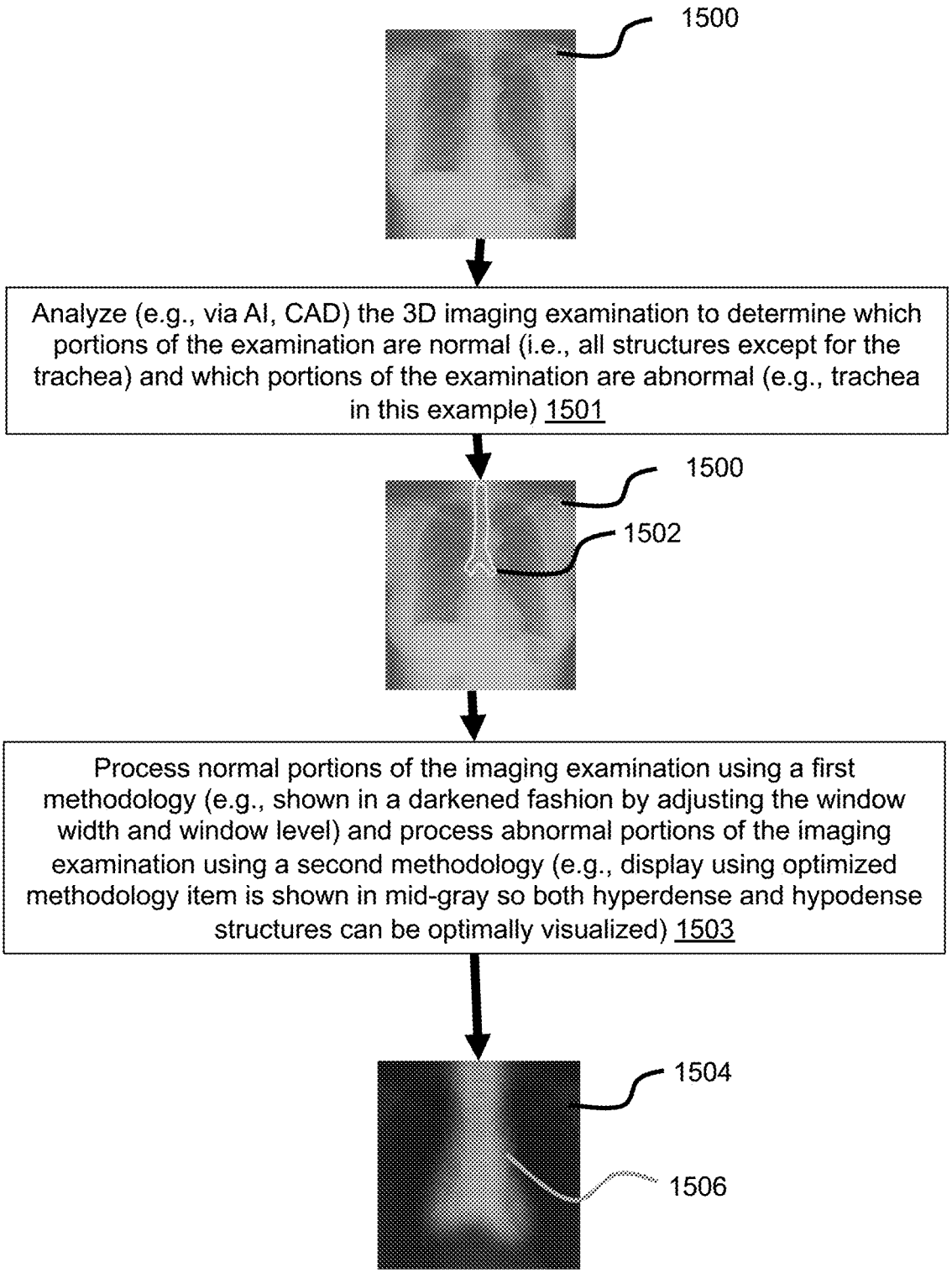
FIG. 15 illustrates implementation of the process for 2D medical images wherein normal portions are darkened.

FIG. 15 illustrates implementation of the process for 2D medical images wherein normal portions are darkened. 1500 illustrates a chest radiograph. 1501 illustrates a processing block configured to analyze (e.g., via AI, CAD) the 3D imaging examination to determine which portions of the examination are normal (i.e., all structures except for the trachea) and which portions of the examination are abnormal (e.g., trachea in this example). 1502 illustrates the segmented structure of the trachea, right mainstem bronchus and left mainstem bronchus. 1503 illustrates a processing block configured to process normal portions of the imaging examination using a first methodology (e.g., shown in a darkened fashion by adjusting the window width and window level) and process abnormal portions of the imaging examination using a second methodology (e.g., display using optimized methodology item is shown in mid-gray so both hyperdense and hypodense structures can be optimally visualized). 1504 illustrates the optimized image, which is also displayed in a zoomed setting. Note that a halo technique 1506 has been utilized, as per US patent application U.S. patent application Ser. No. 16/785,606, IMPROVING IMAGE PROCESSING VIA A MODIFIED SEGMENTED STRUCTURE, which is incorporated by reference in its entirety.

FIG. 16 illustrates visual representation adjustment logic techniques. U.S. Pat. No. 10,586,400, PROCESSING 3D MEDICAL IMAGES TO ENHANCE VISUALIZATION, is incorporated by reference in its entirety. This patent discusses the use of more than one visual representation adjustment logic for a scan. This improved over the prior art because it allowed improved visualization of Hounsfield Unit ranges, which are of interest, as shown in FIG. 2 of the '400 patent. This current patent extends this use of a second, third, or more visual representation adjustment logic for an image because it teaches ways (above the data unit range method discussed in '400) of selecting a group of voxels. Multiple types of visual representation adjustment logic can be implemented.

First, consider presentation of voxels in different colors, gray shades and filtering techniques. Traditionally, a single window/level setting is used for the entire 3D dataset, such as a CT scan of the abdomen and pelvis. This means that all voxels within the 3D dataset have the same settings applied. The window level represents the point of mid gray. The window width represents the range of grayscales. For example, consider a window level of 30 and a window width of 30. A voxel with a Hounsfield unit of 30 would be displayed mid gray on the monitor. A voxel with a Hounsfield unit of 40 would be light gray. A voxel with a Hounsfield unit of 45 or higher would be white. A voxel with a Hounsfield unit of 20 would be dark gray. A voxel with a Hounsfield unit of less than 15 would be black. U.S. Pat. No. 10,586,400, PROCESSING 3D MEDICAL IMAGES TO ENHANCE VISUALIZATION, teaches in FIG. 2 that rather than just using a single window level and window width for the entire image, a second visual representation adjustment logic can be applied, such as is shown in line B in FIG. 2 where voxels in the range of 30-50 are displayed in color in a rainbow fashion whereas voxels with a Hounsfield unit of less than 30 or more than 50 are displayed in grayscale according to the window level and window width of the remaining voxels in the scan. Thus, this patent taught the application of more than one visual representation adjustment logic.

The current patent extends this use of a second visual representation adjustment logic to more types of visual representation adjustment logic, which includes: filtering of pixel(s)/voxel(s); and, altering the shape, size, orientation, location and data unit of a pixel(s)/voxel(s). For example, multiple bands of filtering can be achieved (e.g., filtering voxels with Hounsfield units of −200 or less, so that air is subtracted, which would reduce the size of the dataset and simultaneously filtering voxels with Hounsfield units of 100 or higher, which would subtract the bones). This could also be performed with the "double windowing technique" as described in the previous paragraph.

These techniques can be used in combination via application of a set of rules for filtering can be established. For example, the determination of whether to filter or not is based on whether a voxel is located inside or outside of a segmented structure. For example, if a metal structure (defined as Hounsfield units >1000) is located inside of the body (segmented by the skin surface), then the metal structure would not be filtered. If the metal structure is located outside of the body, then the metal structure would be filtered. Alternatively, consider an intracranial bolt placement. An alternative set of rules would be: apply filtering if and only if outside of a modified segmented region. Note that a modified segmentation region can add voxels in a conformal nature to the outside of a segmented structure, as described in U.S. patent Ser. No. 16/785,606, IMPROVING IMAGE PROCESSING VIA A MODIFIED SEGMENTED STRUCTURE, which is incorporated by reference in its entirety. If the modified segmented structure added 10 mm of halo surrounding the segmented structure (e.g., skin surface of scalp), then the external portion of the intracranial bolt would not be subtracted by using this algorithm. Thus, filtering and segmentation rules can be applied in combination.

The method by which the second, third, or more groups of pixel(s)/voxels within imaging examination are grouped include: grouping by data unit; grouping by location (e.g., use of a 3D volume cursor); grouping by segmented structure; grouping by modified segmented structure; and grouping by combination of the above.

With respect to grouping by data unit (e.g., Hounsfield units). Groups of data units is performed by selecting range(s) of data units and assigning them to a group. For example, assume the range includes 100-150 are assigned to group #1. The top slice may have 300 voxels that fall within that range. These 300 would be assigned to group #1. The second to top slice may have 450 voxels that fall within that range. These 450 voxels would also be assigned to group #1. This process of grouping by data unit can be performed independently or in combination with other grouping strategies. For example, a rule could be programmed that voxels that meet both criteria #1 of falling within the range of 100-150 and criteria #2 of being external to the body (i.e., outside of the skin surface) would be placed into a group.

Another example is grouping by segmented structure. For example, the spleen can be segmented. The voxels which comprise the spleen are grouped into a first group. The voxels which do not comprise the spleen are grouped into a second group.

Another example is grouping by location. This was discussed in U.S. Pat. No. 9,980,691, METHOD AND APPARATUS FOR THREE DIMENSIONAL VIEWING OF IMAGES, which is incorporated by reference in its entirety. A 3D volume cursor subtends (encloses) a volume. This can be moved anywhere in a 3D dataset and advanced image processing can be performed. For example, the 3D cursor can be moved to a place within the volume and certain voxels can be selected. For example, voxels inside of the 3D volume cursor can be grouped into a first group. Voxels outside of the 3D volume cursor can be grouped into a second group. In some embodiments, the abnormality can be within one segmented structure or more than one segmented structure. In some embodiments, a group is defined by a geometric shape surrounding AI identified abnormality (e.g., circle, square, sphere, cube, etc.).

Another example is grouping by modified segmented structure, which is discussed in U.S. patent Ser. No. 16/785, 606, IMPROVING IMAGE PROCESSING VIA A MODIFIED SEGMENTED STRUCTURE, which is incorporated by reference in its entirety. For example, a bottle of oil can be segmented. The goal of the segmentation algorithm is to determine insofar as possible the precise boundaries of the bottle of oil. A modified segmented structure would add layer(s) of pixels/voxels to the external surface of the bottle of oil. An alternative strategy would be to subtract layer(s) of voxels from the surface of the segmented structure in an inward fashion to generate a different type of modified segmented structure.

Thus, the volume of the 3D imaging dataset can be divided. In some embodiments, a checklist item can be linked to a segmented structure. As a radiologist is on a particular checklist item, a predetermined visual representation can be performed for the corresponding segmented structure. For example, when the radiologist moves to the liver item on the checklist, the image can be optimized for detection of liver abnormalities. Furthermore, if the clinical history states a particular finding (e.g., carcinoid tumor, evaluate for hypervascular liver metastasis), then system can display the image optimized for detecting a specific type of abnormality (e.g., hypervascular liver metastases in this example).

Additionally, the visual representation adjustment logic can be determined based on the AI identified abnormality. For example, the AI system can determine that the most optimum display method to show the abnormality to a user on a 2D axial slice of a CT scan of the abdomen and pelvis. For example, the AI determines that a first 2D slice should have a portion of the 2D axial slice with a window level of 30 and window width of 30. As the radiologist scrolls to a new region, the AI may detect a different finding and then adjust the window level to 35 and the window width to 60. Thus, in some embodiments, an abnormality identified on an AI system can also be displayed in using AI-controlled viewing parameters, such as wherein the AI system performs windowing and leveling to optimize visualization of an abnormality. This process can be performed by using training data with optimized viewing parameters for a particular abnormality.

In some embodiments, the location within the field of view (e.g., center, peripheral or upper quadrant of display) can be utilized as a factor for determining (1) the type of visual representation adjustment logic used (e.g., brightness, color, flashing display, annotations, voxel manipulation, etc.), (2) the particular group assigned to.

In some embodiments, the certainty of AI identified abnormality is a factor in determining (1) the type of visual representation adjustment logic and (2) the particular group assigned to.

In some embodiments, the property of a segmented structure can be a factor in determining the visual representation adjustment logic. For example, shape (e.g., round shaped, irregular shaped, etc.), size (e.g., smaller than 1 cm$^3$, larger than 1 cm$^3$, etc.), margins (e.g., smooth, ill-defined, spiculated, etc.), internal architecture (e.g., homogeneous, heterogeneous, etc.), and prioritization (as described in U.S. Pat. No. 10,766,989, A METHOD AND APPARATUS FOR PRIORITIZED VOLUME RENDERING, which is incorporated by reference in its entirety) are all imaging features that can be used to determine the type of visual representation adjustment logic or the particular group assigned.

Figure 17A:
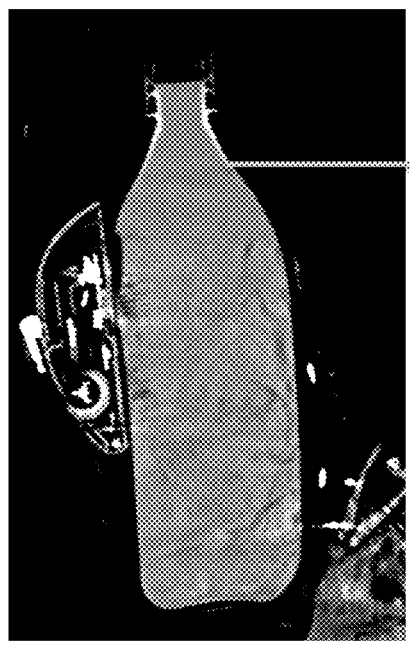
FIG. 17A illustrates a 2D slice of an object within a bag.

FIG. 17A illustrates a 2D slice of an object within a bag. 1700 illustrates the object, which in this case is a bottle of olive oil.

Figure 17B:
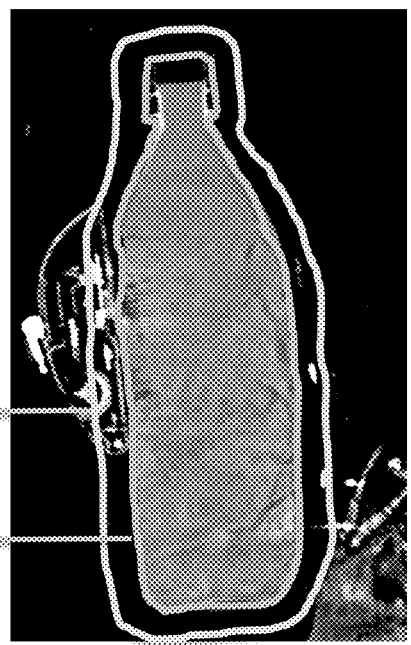
FIG. 17B illustrates a 2D slice of an object within a bag with traditional segmentation and conformal boundary method type segmentation.

FIG. 17B illustrates a 2D slice of an object within a bag with traditional segmentation and conformal boundary method type segmentation. 1701 illustrates a line representing the boundary of object 1700, which represents traditional type segmentation wherein the goal is to determine the exact boundary of an object. 1702 illustrates a line representing the conformal boundary. The conformal boundary 1702 is achieved by adding layers to the traditional boundary 1701.

Figure 17C:
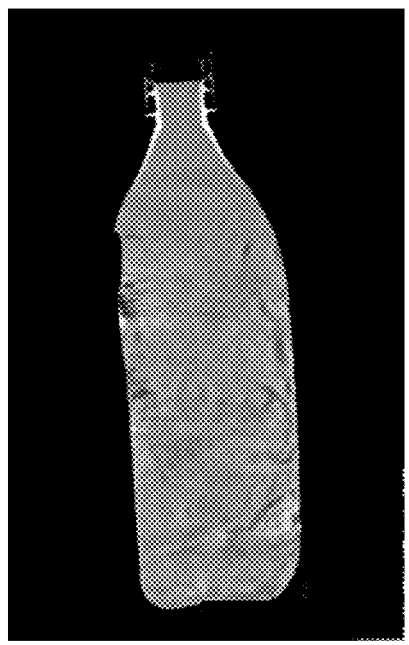
FIG. 17C illustrates a 2D slice of an object within a bag with traditional segmentation and filtering applied.

FIG. 17C illustrates a 2D slice of an object within a bag with traditional segmentation and filtering applied. Note that all material external to the traditional boundary 1701 determined via segmentation has been filtered (subtracted).

Figure 17D:
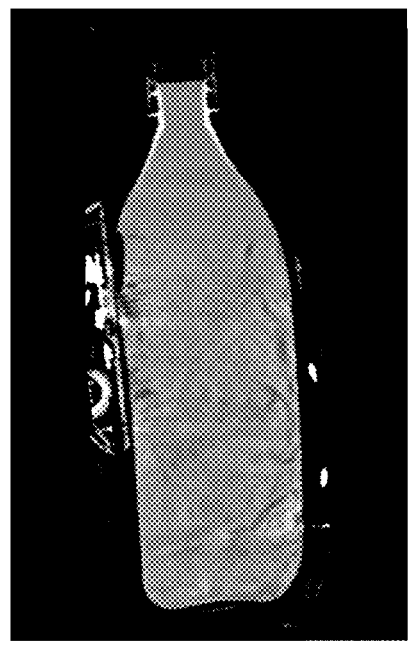
FIG. 17D illustrates a 2D slice of an object within a bag with conformal boundary method type segmentation and filtering applied.

FIG. 17D illustrates a 2D slice of an object within a bag with conformal boundary method type segmentation and filtering applied. Note that all material external to the conformal boundary 1702 determined via the conformal boundary method has been filtered (subtracted). Filtering by a "conformal boundary method" as taught in U.S. patent application Ser. No. 16/785,606, IMPROVING IMAGE PROCESSING VIA A MODIFIED SEGMENTED STRUCTURE, which is incorporated by reference in its entirety. In this algorithm, we perform segmentation of an object in attempt to delineate the exact boundary of the object. Then, we add at least one (but typically several) layer(s) of voxels to the external surface of the segmented object. It should be noted that the layers are added irrespective of the Hounsfield Units. This process creates a "bubble" or "halo" appearance around a segmented structure. This process is especially important for TSA. For example, consider a scenario wherein a criminal took a metal box containing a bullet and toy jacks (metal toy with 6 spikes). First, consider an extremely tight (e.g., <1 standard deviation) boundary for segmentation; such a tight boundary could cause a portion of the bullet to be cut off rendering it unrecognizable as a bullet and result in a classification error and potentially a major catastrophe. Second, consider a more lenient cut-off (e.g., 1.5 standard deviations). A segmentation algorithm attempting to find and display the bullet could easily be fooled by the toy jacks using such a boundary. Such an algorithm would successfully identify the bullet by the density, but the segmentation algorithm may grow into a large complex architecture due to the fact that the bullet touches some metal jacks. A TSA Agent viewing the segmented object would see a multi-layered mesh appearance, not a bullet. The "conformal boundary method could be performed in conjunction with tight (e.g., <1 standard deviation). Such a thresholds would generate a halo or bubble around the bullet and would not be vulnerable to the toy jacks.

FIG. 18 illustrates preferred viewing options for 2D slice-by-slice viewing. The table illustrates the preferred viewing options for the normal portions of the volume and the abnormal portions of the volume. With respect to the window level setting, the normal portions will be non-optimized and the abnormal portions will be optimized. With respect to filtering, the normal portions will be filtered and the abnormal portions will be non-optimized. A technique would be to subtract a fraction of the normal portions). For example, take 4 pixels in the form of a square. Average the data units of these 4 pixels. Filter 3 of the 4 pixels (and present them as black). Change the data unit of the 4th pixel to be equal to the average of the 4 pixels. Do this for all pixels for a normal segmented structure. This process will present a 2D slice in such a way to give the user some context as to the normal but will enhance viewing of the abnormal structure. There are two points of novelty described herein. First, is performing filtering on a 2D slice. Second is performing data unit alterations. With respect to transparency adjustment, the normal portions will be made more transparent. For example, consider a black background and a window level of 50. Consider a pixel of a normal structure with Hounsfield Unit of 50 and a pixel of an abnormal structure with Hounsfield Unit of 50. Assume that the pixel of the abnormal structure is displayed with a non-transparent display, which would cause the pixel would be displayed as mid gray. Assume that the pixel of the normal structure is displayed with a 50% transparency, which would cause the pixel to be displayed as dark gray. With respect to smoothing, the normal portions would be displayed with more smoothing and the abnormal portions would be displayed with less smoothing. Consider a 3×3 array of 9 pixels in a square. The data unit of middle pixel could be averaged with the surrounding 8 pixels. This process could be repeated for all pixels for a normal structure. This would result in a smooth appearance for the normal structure. If this smoothing technique were not performed for the abnormal structure, then the abnormal structure would be less smooth. This would result in a more eye appealing image to the user.

With respect to spatial resolution, in the preferred embodiment the normal portions are displayed with less spatial resolution and the abnormal portions are displayed with higher spatial resolution. This could be performed by changing the voxel size, which is taught in U.S. Pat. No. 10,586,400, PROCESSING 3D MEDICAL IMAGES TO ENHANCE VISUALIZATION, which is incorporated by reference in its entirety. With respect to contrast resolution, in the preferred embodiment, the normal portions would have a lower contrast resolution and the abnormal portions would have a higher contrast resolution. This could be performed by using a wider window for the normal portions as compared to the abnormal portions. For example, both the normal portions and abnormal portions could have a window level of 50. The normal portions could have a window width of 100 and the abnormal portions could have a window width of 50. This would result in a more significant change in presented gray scale over a smaller change in Hounsfield units for the abnormal portions as compared to the normal portions. With respect to brightness, the brightness level (e.g., $cd/m^2$) of the normal portions could be set to be darker as compared to the abnormal portions. This would cause the user's eyes to focus more attentively on the bright structures (which are abnormal). This could be achieved through using a different window level setting for the normal portions as compared to the abnormal portions. For example, for the normal portions, the window level setting could be set at 60 and the window width of 60 as well. This would mean a pixel in the normal portion whose Hounsfield unit was 60 would be mid gray and a pixel of Hounsfield unit of 40 would be dark gray. In contrast, for the abnormal portions, the window level setting could be set at 40 and the window width of 60 as well. This would mean that a pixel in the abnormal portions whose Hounsfield unit of 60 would be displayed as light gray and a pixel of Hounsfield unit of 40 would be mid gray. Thus, the normal portions would be darkened as compared to the abnormal portions. With respect to color, the normal portions could be displayed with darker shades of color and the abnormal portions could be displayed with lighter shades of color. For example, the normal portions could be displayed in shades of dark blue and the abnormal portions could be displayed in brighter gray shades. Again, this would optimize visualization of the abnormal portions.

Figure 19:
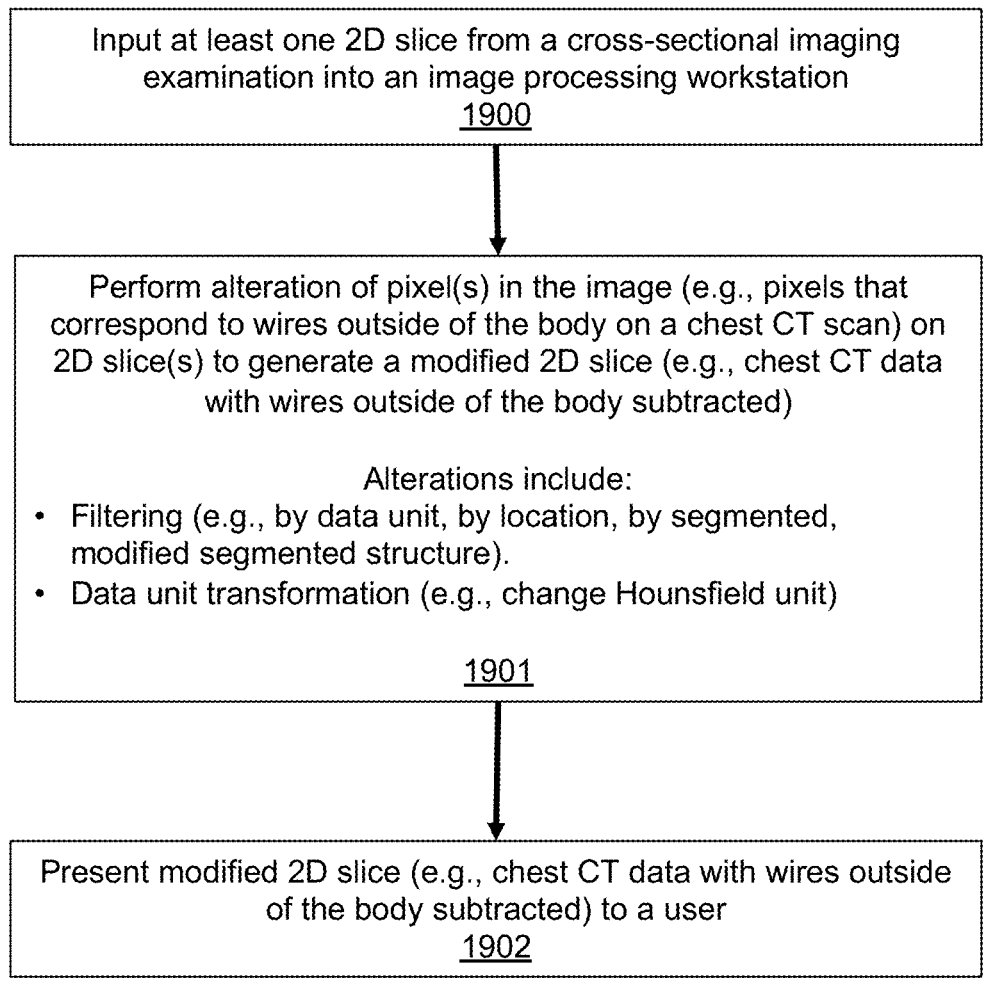
FIG. 19 illustrates performing image alterations of a 2D slice.

FIG. 19 illustrates performing image alterations of a 2D slice. Processing block 1900 illustrates inputting at least one 2D slice from a cross-sectional imaging examination into an image processing workstation. Processing block 1901 illustrates performing alteration of pixel(s) in the image to generate a modified 2D slice. For example, consider a pixels that correspond to wires outside of the body on a chest CT scan) on 2D slice(s) to generate a modified 2D slice (e.g., chest CT data with wires outside of the body subtracted). The alterations include: filtering (e.g., by data unit, by location, by segmented, modified segmented structure); and, performing data unit transformation (e.g., change Hounsfield unit). In this embodiment, filtering is applied to a slice. This improves over the current process because this process takes a standard 2D slice, performs a filtering process to generate an enhanced 2D slice. Multiple types of filtering can be performed. For example, methods include: filtering by data unit (e.g., Hounsfield unit); filtering by location (e.g., pixel coordinate); filtering by segmented structure (e.g., segment wires and filter out segmented wires); and, filtering by modified segmented boundary (e.g., inner/outer). For medical diagnosis, it would be reasonable to filter all structures outside of the body. This would generate a clearer image and less distracting to the user. For example, wires overlying the chest are commonly placed for medical purposes, such as monitoring the heart, which occurs while the patient is in a CT scanner getting the scan. Processing block 1902 illustrates presenting modified 2D slice (e.g., chest CT data with wires outside of the body subtracted) to a user.

FIG. 20A illustrates a set of pixels of a 2D slice of a scanned volume. A 10×10 grid is shown to illustrate 100 pixels from a 2D slice. An example would be a CT Scan of the abdomen and pelvis. Each pixel has an associated data unit (e.g., Hounsfield Unit). For example, in the top row from left to right, the Hounsfield Units are 40, 38, 34, 35, 35, 34, 35, 36, 35, and 34. Note that 14 of the pixels have data units in the 50s.

FIG. 20B illustrates a set of pixels of a 2D slice of a scanned volume, of which 14 of the pixels have undergone filtering. Note that the 14 pixels which have data units in the 50s have undergone filtering. Now, the 2D slice contains empty pixels (pixels that do not have an associated data unit). These could be set to default to pure black or pure white no matter what the window width or window level setting is selected. This could be performed to filter data, such as data external to the skin of the chest, such as is taught in FIG. 21.

Figure 21:
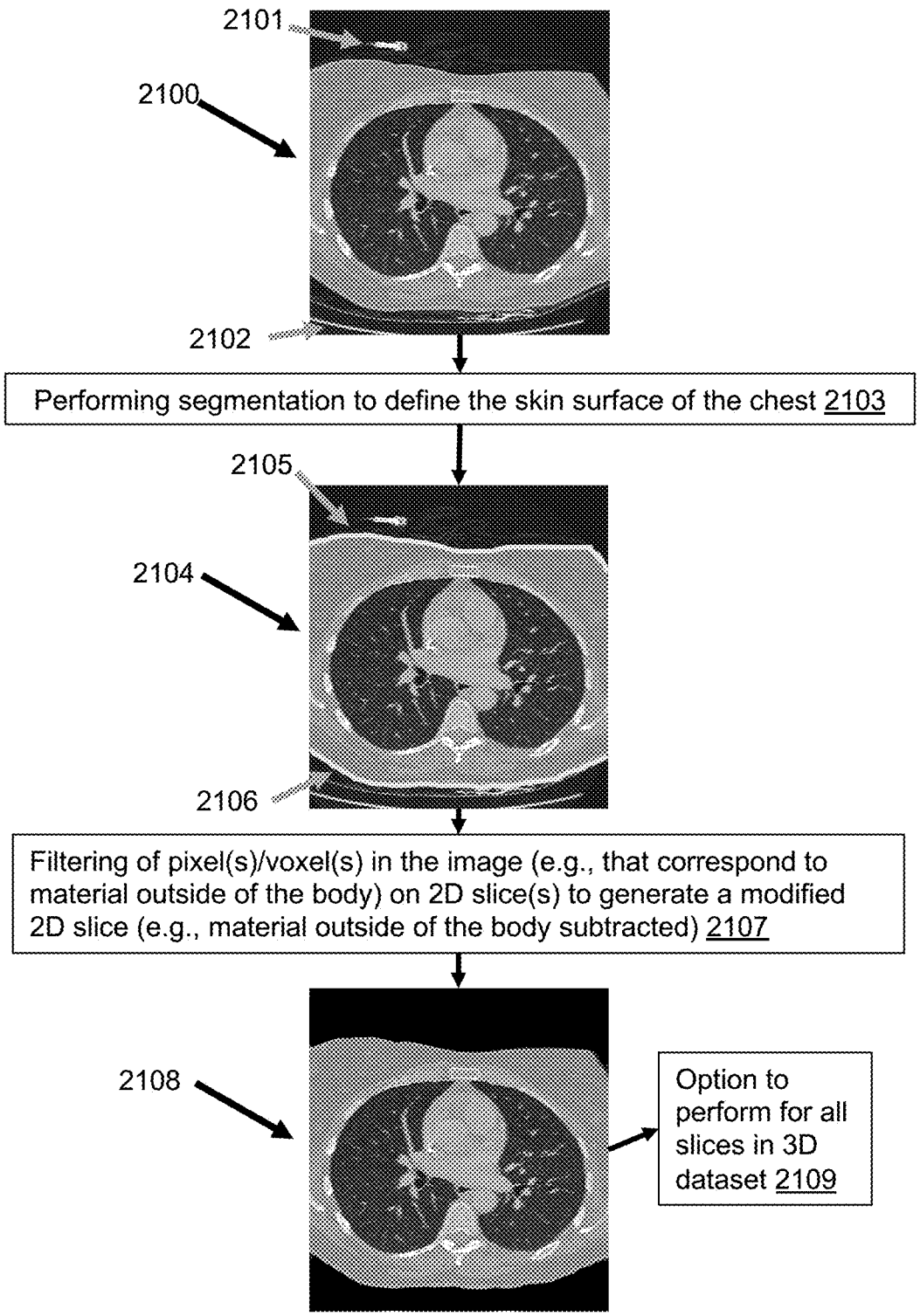
FIG. 21 illustrates implementing filtering on a 2D slice.

FIG. 21 illustrates implementing filtering on a 2D slice. 2100 illustrates an image of a CT slice of the chest, which is displayed using state-of-the-art technology as of the year 2021. 2101 illustrates a metallic device located outside of the body. 2102 illustrates a radiodense portion of the gurney that the patient is laying on during the scan. 2103 illustrates a processing block of performing segmentation to define a structure of interest (e.g., skin surface of the chest). 2104 illustrates the image of the CT slice of the chest which is annotated with a first line 2105 showing the anterior surface of the chest, which has been segmented and a second line 2106 showing the posterior surface of the chest, which has been segmented. 2107 illustrates a processing block of performing filtering of pixel(s) in the image (e.g., pixels that correspond to material outside of the body) on 2D slice(s) to generate a modified 2D slice (e.g., material outside of the body subtracted). The outside of the body (skin surface) is segmented. All pixels (or voxels) external to the skin surface are subtracted. 2108 illustrated displaying the modified 2D slice to a user. Note that there is an option for processing block 2109, which is to perform this for all 2D slices in the cross-sectional imaging dataset. The processed image has voxels external to the skin surface are subtracted. This improves over the 2021 state-of-the-art technology because the image has a cleaner appearance and is less distracting to a user. For example, the metallic device located outside of the body will not be a distractor to the radiologist's eye. The modified 2D slice (e.g., chest CT data with wires outside of the body subtracted) is presented to a user.

FIG. 22A illustrates a set of pixels of a 2D slice of a scanned volume. A 10×10 grid is shown to illustrate 100 pixels from a 2D slice. An example would be a CT Scan of the abdomen and pelvis. Each pixel has an associated data unit (e.g., Hounsfield Unit). For example, in the top row from left to right, the Hounsfield Units are 40, 38, 34, 35, 35, 34, 35, 36, 35, and 34. Note that 14 of the pixels have data units in the 50s.

FIG. 22B illustrates a set of pixels of a 2D slice of a scanned volume, of which 14 of the pixels have undergone alteration of data units. Note that the 14 pixels which have data units in the 50s have undergone an alteration to Hounsfield Unit of 70. When a user performs windowing and leveling, this cluster of 14 pixels will stand out more from the background, as compared to FIG. 1A. Furthermore, this area will appear homogeneous. This could help improve conspicuity of a hypervascular liver metastasis on a CT scan.

Figure 23:
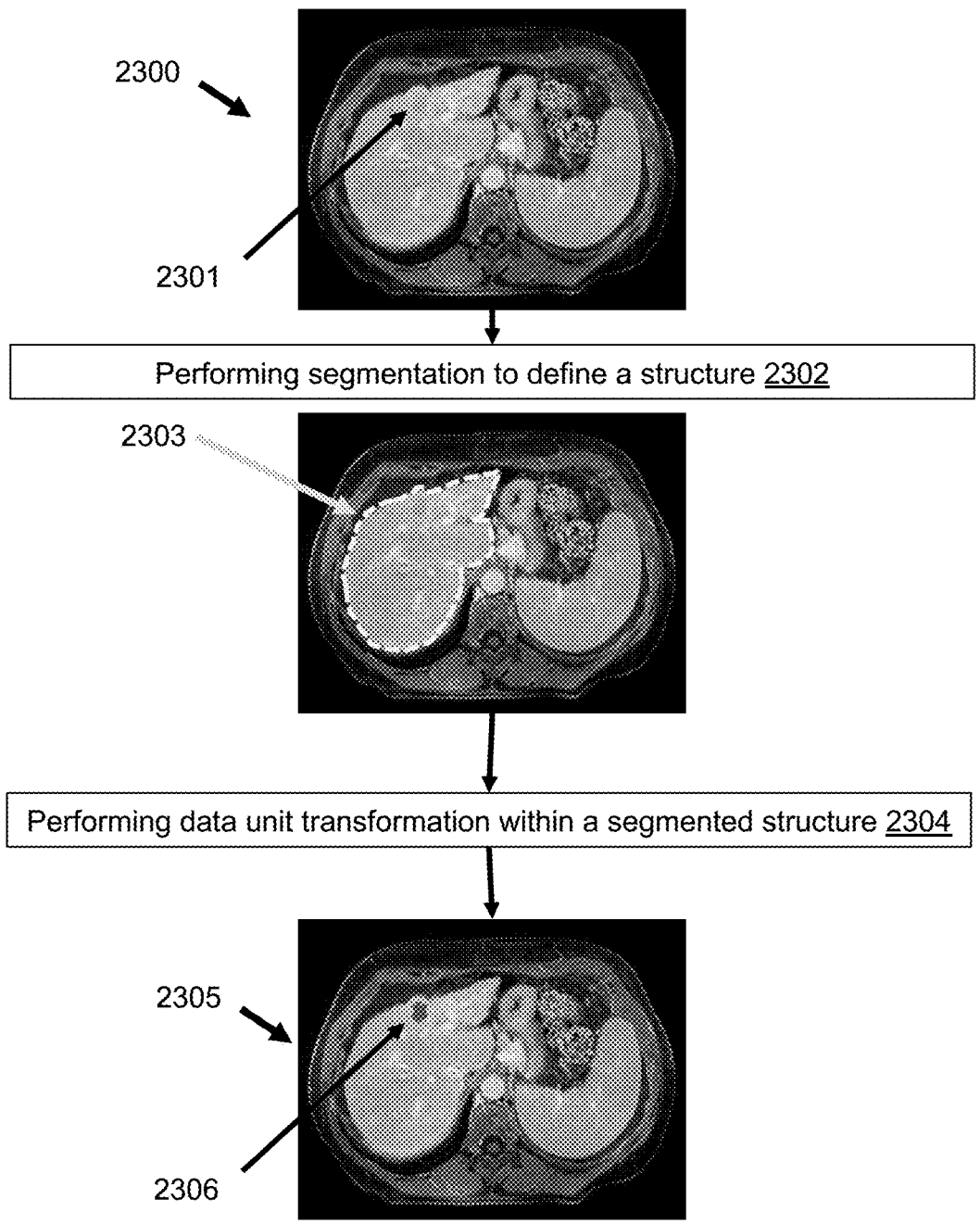
FIG. 23 illustrates implementing 2D slice enhancement.

FIG. 23 illustrates implementing 2D slice enhancement. 2300 illustrates an image of a MRI slice of the abdomen, which is displayed using state-of-the-art technology as of 2021. 2301 illustrates a very subtle mass lesion within the slice. Note that the data units of the mass lesion are ever so slightly different from those of normal liver. A lesion with presented gray scale very similar to background liver can be missed. 2302 illustrates a processing block of performing segmentation to define a structure. 2304 illustrates a processing block of performing a data unit transformation within a segmented structure. 2405 illustrates an enhanced image, which is presented to the user. Note that the small lesion 2301 is displayed in an enhanced manner, which is now more noticeable as shown in 2306. Note techniques in U.S. Pat. No. 10,586,400, PROCESSING 3D MEDICAL IMAGES TO ENHANCE VISUALIZATION, which is incorporated by reference in its entirety.

FIG. 24 illustrates the preferred embodiment for the volume rendering approach. A table is shown to teach the preferred viewing for portions of the image, which are determined by the AI to be normal and portions of the image, which are determined by the AI to be abnormal.

The filtering process is described in U.S. Pat. No. 8,384,771, METHOD AND APPARATUS FOR THREE DIMENSIONAL VIEWING OF IMAGES, which is incorporated by reference in its entirety. In some embodiments, if a structure is deemed to be normal by an AI algorithm, the structure is filtered. To further explain this, assume a CT Scan of the abdomen and pelvis is performed and the AI algorithm reviews the scan and determines that the liver is normal. In this embodiment, the liver can be filtered entirely (subtracted) and the radiologist would view the CT scan of the abdomen and the liver would be absent (because it is normal and therefore filtered). Also, consider the application for detection of other abnormalities using a CT scanner. With respect to the DHS concept of CT scan of a bag, non-contraband could be filtered.

With respect to transparency adjustment, normal portions would have higher transparency and abnormal portions would have lower transparency. For example, if the liver were normal, it could be rendered nearly completely or completely transparent. If the spleen were abnormal, it could be rendered non-transparent. This would improve visualization of the abnormal items within the volume.

With respect to smoothing, the normal portions would be made more smooth appearing. This would result in the normal portions being easier to look at, prettier to look at and not as overwhelming to a user. The abnormal portions would be less smooth, which would result in greater visualization of texture, which is important in image analysis. For example, a small bone lesion which infiltrates the fine cancellous bony trabeculae may result in a texture abnormality which may be better visualized using a less smoothing approach.

With respect to spatial resolution, the normal portions would be viewed with lower spatial resolution as extremely high detail would not necessarily be necessary for normal structures. In contrast, the abnormal portions would be viewed with higher spatial resolution as additional detail would be of diagnostic benefit, such as looking for a hair line fracture.

With respect to contrast resolution, the normal portions would be viewed with a lower contrast resolution. For example, if the liver were normal, it would not be necessary to see lots of shades of gray for the liver. In contrast, if the liver were abnormal, then lots of shades of gray would be needed as this could prove helpful at lesion detection and characterization.

With respect to brightness, the normal portions would be darker (e.g., lower candela per meter squared). The human eye has a tendency to be drawn to the brighter object on a dark background. Therefore, if the normal structures were made darker and the abnormal structures were made brighter, it would draw the human eye to the abnormal structures.

With respect to color, the normal portions would be made darker colors (e.g., use dark earth tones) or gray scale in the preferred embodiment. In contrast, the abnormal portions would be made of brighter colors. This would draw the attention to the abnormal portions and enhance visualization of the abnormal portions.

With respect to prioritized volume rendering, the abnormal portions could be optimized with a prioritized volume rendering strategy and the normal portions would be assigned lower priority. This would draw the attention of the user to the abnormal portions and enhance visualization of the abnormal portions.

With respect to tandem volume rendering, the abnormal portions could be optimized with a preferred type of volume rendering (e.g., voxel rendering) and the normal portions could be optimized with a less preferred type of volume rendering (e.g., point cloud).

FIG. 25 illustrates implementing the enhance viewing process of abnormal portions using volume rendering technique. 2500A illustrates a volume rendered image. 2501A illustrates the distal esophagus, which is displayed in a non-transparent fashion. 2502A illustrates the stomach, which is displayed in a non-transparent fashion. 2503A illustrates the duodenum, which is displayed in a non-transparent fashion. 2504A illustrates the liver, which is displayed in a non-transparent fashion. 2505A illustrates the right kidney, which is displayed in a non-transparent fashion. 2506A illustrates the left kidney, which is displayed in a non-transparent fashion. 2507A illustrates the spleen, which is displayed in a non-transparent fashion. 2508A illustrates the pancreas, which is displayed in a non-transparent fashion. 2509 illustrates a processing block of analyzing (e.g., via AI, CAD) the 3D imaging examination to determine which portions of the examination are normal (i.e., all structures except for the pancreas) and which portions of the examination are abnormal (e.g., pancreas in this example). 2510 illustrates a processing block of process normal portions of the imaging examination using a first methodology (e.g., shown in a partially transparent fashion) and process abnormal portions of the imaging examination using a second methodology (e.g., display in a non-transparent fashion). 2500B illustrates a modified volume rendered image wherein the abnormal portion (as determined by the AI algorithm) is displayed in a non-transparent fashion and all other structures are displayed in a partially transparent fashion. 2501B illustrates the distal esophagus, which is displayed in a partially transparent fashion. 2502B illustrates the stomach, which is displayed in a partially transparent fashion. 2503B illustrates the duodenum, which is displayed in a partially transparent fashion. 2504B illustrates the liver, which is displayed in a partially transparent fashion. 2505B illustrates the right kidney, which is displayed in a partially transparent fashion. 2506B illustrates the left kidney, which is displayed in a partially transparent fashion. 2507B illustrates the spleen, which is displayed in a partially transparent fashion. 2508B illustrates the pancreas, which is displayed in a non-transparent fashion. Thus, an improved presentation is achieved wherein the abnormal portions are superbly visualized.

Throughout the entirety of the present disclosure, use of the articles "a" or "an" to modify a noun may be understood to be used for convenience and to include one, or more than one of the modified noun, unless otherwise specifically stated. Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein. The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation. References to "a microprocessor and "a processor, or "the microprocessor and "the processor." may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor or "processor terminology may thus also be understood to include a central processing unit, an arithmetic logic unit, an application-specific integrated circuit (IC), and/or a task engine, with such examples provided for illustration and not limitation. Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where Such memory may be contiguous and/or partitioned based on the application. Accordingly, references to a database may be understood to include one or more memory associations, where such references may include commercially available database products (e.g., SQL, Informix, Oracle) and also include proprietary databases, and may also include other structures for associating memory Such as links, queues, graphs, trees, with such structures provided for illustration and not limitation. References to a network, unless provided otherwise, may include one or more intranets and/or the Internet, as well as a virtual network. References hereinto microprocessor instructions or microprocessor-executable instructions, in accordance with the above, may be understood to include programmable hardware.

Unless otherwise stated, use of the word "substantially' may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" or "an' to modify a noun may be understood to be used for convenience and to include one, or more than one of the modified noun, unless otherwise specifically stated. Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein. Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art. Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

Several features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. A system comprising:
a memory;
a processor;
a display;
a communication interface;
an interconnection mechanism coupling the memory, the processor and the communication interface; and
wherein the memory is encoded with an application providing image processing, that when performed on the processor, provides a process for processing information, the process causing the computer system to perform the operations of:
performing artificial intelligence algorithm to classify portions of an image as normal and portions of said image as abnormal;
performing a first type of image processing for said normal portion(s) of said image;
performing a second type of image processing for said abnormal portion(s) of said image wherein said second type of image processing is different from said first type of image processing; and
displaying on said display said normal portion(s) of said image with said first type of image processing and said abnormal portion(s) of said image with said second type of image processing.

2. The system of claim 1 further comprising dividing said image into said normal portion(s) and said abnormal portion(s) via a segmentation algorithm.

3. The system of claim 1 further comprising dividing said image into said normal portion(s) and said abnormal portion(s) via a halo-type modified segmentation algorithm.

4. The system of claim 1 further comprising delineating said abnormal portion(s) via a geometric shape surrounding said abnormal portion(s).

5. The system of claim 1 further comprising wherein said second type of image processing is determined by a danger of said abnormal portion(s).

6. The system of claim 1 further comprising wherein said second type of image processing is determined by a certainty of classification of said abnormal portion(s).

7. The system of claim 1 further comprising wherein displaying normal portion(s) of said image with said first type of image processing and said abnormal portion(s) of said image with said second type of image processing is performed simultaneously.

8. The system of claim 1 further comprising wherein displaying normal portion(s) of said image with said first type of image processing and said abnormal portion(s) of said image with said second type of image processing is performed sequentially.

9. The system of claim 1 further comprising providing a visual marker to notify a user of an abnormal finding as determined by an artificial intelligence algorithm.

10. The system of claim 9 further comprising wherein said visual marker comprises at least one of the group consisting of:
an arrow; and
a 3D volume cursor.

11. The system of claim 1 further comprising wherein said first type of image processing and said second type of image processing comprise at least one of the group consisting of:
performing a smoothing algorithm;
performing windowing and leveling;
performing coloring;
performing filtering;
performing transparency adjustment;

performing alteration of spatial resolution;
performing alteration of contrast resolution;
performing alteration of brightness;
performing prioritized volume rendering; and
performing tandem volume rendering.

12. The system of claim 1 further comprising wherein said image is viewed on an extended reality display.

13. The system of claim 1 further comprising wherein said image is a CT scan of a bag.

14. The system of claim 1 further comprising wherein said abnormal portion(s) are determined by said artificial intelligence algorithm to be a dangerous item.

15. The system of claim 1 further comprising wherein said abnormal portion(s) are determined by said artificial intelligence algorithm to be a contraband item.

16. The system of claim 1 further comprising wherein said abnormal portion(s) are determined by said artificial intelligence algorithm to be a suspicious/uncertain item.

17. The system of claim 1 further comprising performing analysis of said image by a user.

18. A system comprising:
a memory;
a processor;
a display;
a communication interface;
an interconnection mechanism coupling the memory, the processor and the communication interface; and
wherein the memory is encoded with an application to determine whether a bag contains a prohibited item, that when performed on the processor, provides a process for processing information, the process causing the computer system to perform the operations of:
using an image from a CT scan of a bag;
performing an artificial intelligence algorithm to classify portions of said image as normal and portions of said image as abnormal;
performing a first type of image processing for said normal portion(s) of said image;
performing a second type of image processing for said abnormal portion(s) of said image wherein said second type of image processing is different from said first type of image processing; and
displaying on said display said normal portion(s) of said image with said first type of image processing and said abnormal portion(s) of said image with said second type of image processing to a user for analysis of said image.

19. A system comprising:
a memory;
a processor;
a display;
a communication interface;
an interconnection mechanism coupling the memory, the processor and the communication interface; and
wherein the memory is encoded with an application to triage a bag that when performed on the processor, provides a process for processing information, the process causing the computer system to perform the operations of:
using an image from a CT scan of a bag;
performing artificial intelligence algorithm to classify portions of said image as normal and portions of said image as abnormal;
performing a first type of image processing for said normal portion(s) of said image;
performing a second type of image processing for said abnormal portion(s) of said image wherein said second type of image processing is different from said first type of image processing;
displaying on said display said normal portion(s) of said image with said first type of image processing and said abnormal portion(s) of said image with said second type of image processing; and
if said abnormal portion(s) are determined to be a prohibited item, selecting said bag to be triaged to an area.

* * * * *